United States Patent
Okabe et al.

(10) Patent No.: US 8,058,834 B2
(45) Date of Patent: Nov. 15, 2011

(54) CONTROL DEVICE FOR AUTOMATIC TRANSMISSION

(75) Inventors: Takeru Okabe, Chiyoda-ku (JP); Shiro Yonezawa, Chiyoda-ku (JP); Nozomu Kamioka, Chiyoda-ku (JP); Tomohisa Shoda, Chiyoda-ku (JP); Masaki Horii, Chiyoda-ku (JP); Yasufumi Ogawa, Chiyoda-ku (JP); Osamu Ishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 478 days.

(21) Appl. No.: 12/366,306

(22) Filed: Feb. 5, 2009

(65) Prior Publication Data

US 2009/0289593 A1 Nov. 26, 2009

(30) Foreign Application Priority Data

May 23, 2008 (JP) ................................ 2008-135507

(51) Int. Cl.
*G05F 1/00* (2006.01)
*H02K 29/08* (2006.01)
*G06F 7/00* (2006.01)
*G05D 1/00* (2006.01)
*B60K 1/00* (2006.01)
*B60K 17/00* (2006.01)

(52) U.S. Cl. ..................... 318/647; 318/400.38; 701/51; 701/52; 701/61; 701/67; 701/87; 180/65.7; 180/294; 180/347

(58) Field of Classification Search ............. 318/400.38, 318/647; 701/51, 52, 53, 61, 67, 87; 180/65.7, 180/294, 347
See application file for complete search history.

(56) References Cited

U.S. PATENT DOCUMENTS

| | | | | |
|---|---|---|---|---|
| 4,648,040 A | * | 3/1987 | Cornell et al. | 701/52 |
| 4,663,713 A | * | 5/1987 | Cornell et al. | 701/52 |
| 4,663,714 A | * | 5/1987 | Cornell et al. | 701/52 |
| 4,993,527 A | * | 2/1991 | Benford et al. | 477/65 |
| 5,289,890 A | * | 3/1994 | Toyoda et al. | 180/65.8 |
| 7,228,209 B2 | * | 6/2007 | Izawa et al. | 701/22 |
| 2010/0045219 A1 | * | 2/2010 | Ajima et al. | 318/400.04 |
| 2010/0125395 A1 | * | 5/2010 | Horii et al. | 701/51 |

FOREIGN PATENT DOCUMENTS

| | | |
|---|---|---|
| JP | 03-065058 A | 3/1991 |
| JP | 11-275882 A | 10/1999 |
| JP | 2000-166277 A | 6/2000 |
| JP | 2002-081472 A | 3/2002 |
| JP | 2004-019737 A | 1/2004 |
| JP | 2004-282969 A | 10/2004 |
| JP | 2006-020440 A | 1/2006 |
| JP | 2008-043012 A | 2/2008 |

* cited by examiner

*Primary Examiner* — Walter Benson
*Assistant Examiner* — Gabriel Agared
(74) *Attorney, Agent, or Firm* — Sughrue Mion, PLLC

(57) ABSTRACT

A control device for an automatic transmission includes a current detecting unit for detecting motor current. The current detecting unit has a counter for counting variation number of a rotational position signal output from a rotational position detecting unit for detecting the rotational position of a motor, and an electrical angle 180° judging unit for judging rotation of electrical angle 180° of the motor. A voltage occurring in a current detecting resistor is sampled at a timing of each integral multiple of the electrical angle of 180° judged in the electrical angle 180° judging unit, and rotation of the motor is controlled in accordance with the difference between motor target current calculated in the motor target current calculating unit and motor current.

8 Claims, 14 Drawing Sheets

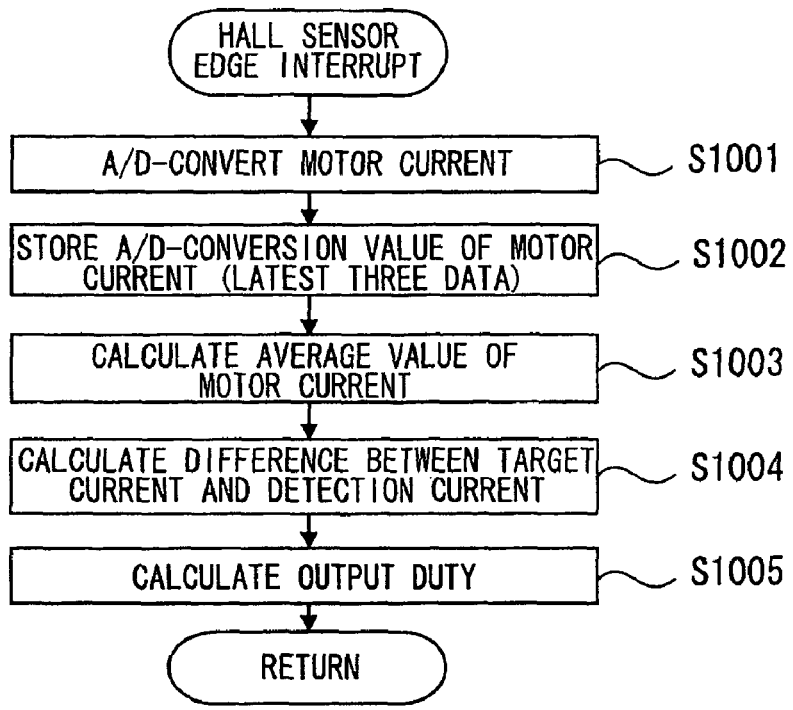
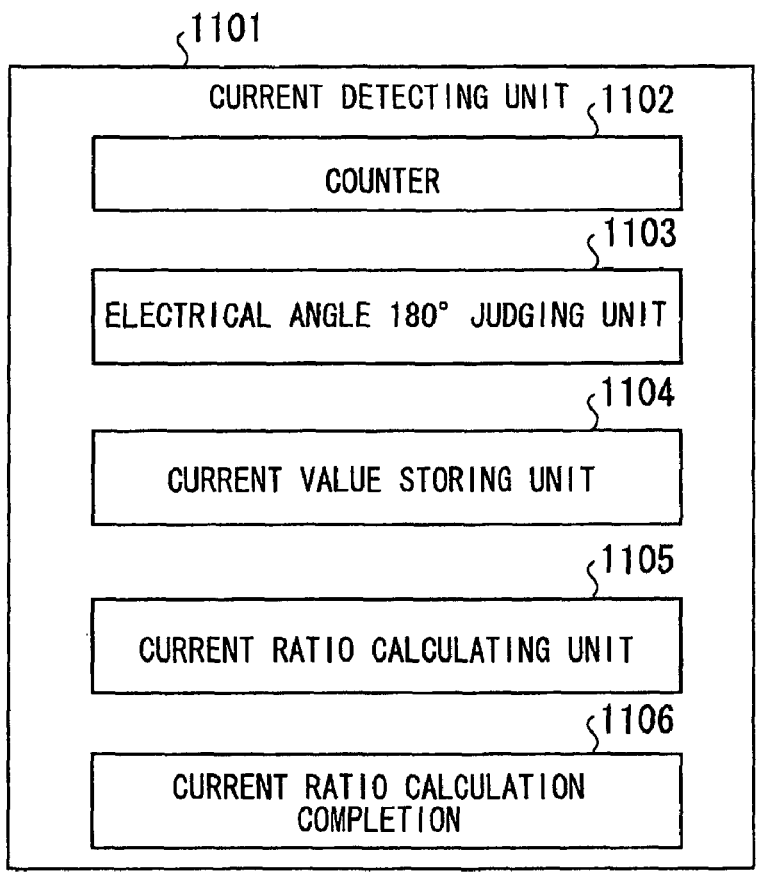

CONTROL DEVICE FOR AUTOMATIC TRANSMISSION

BACKGROUND OF THE INVENTION

1. Field of the Invention

The present invention relates to a control device for an automatic transmission mounted in a vehicle such as a car or the like, and particularly to an automatic transmission control device for performing gearshift control by using a motor.

2. Description of the Related Art

In general, a vehicle such as a car or the like which has an automatic transmission mounted therein uses an engine as a driving power source, and transmits the driving power generated by the engine through the automatic transmission to wheels, whereby the vehicle can run. A start clutch is provided in the automatic transmission, and when it is necessary to transmit the driving power transmitted from the engine to a gear mechanism, the start clutch is engaged with the gear mechanism. Conversely, when it is unnecessary to transmit the driving power to the gear mechanism, the start clutch is disengaged from the gear mechanism. The control of the engagement/disengagement of the start clutch is executed by a clutch control unit.

Here, when the engaging force of the clutch is unstable, the driving power transmitted from the engine to the gear mechanism becomes unstable, and finally the driving power transmitted to the wheels becomes unstable. Therefore, this makes the traveling state of the vehicle unstable, and it makes a driver feel uncomfortable. As described above, in order to keep the traveling state of the vehicle stable, the start clutch is required to precisely control the engaging force thereof.

There is known an automatic transmission in which the transmission of the driving power from the engine to the gear mechanism is executed by the start clutch as described above. In the automatic transmission having the start clutch, a dry single plate type start clutch is provided with an actuator, and the actuator changes the stroke amount of the start clutch to thereby adjust the clutch engaging force. When the automatic transmission is configured so that a motor is used as the actuator and the rotational angle of the motor is proportional to the stroke amount of the start clutch, it is required to precisely adjust the torque amount of the motor in order to adjust the engaging force of the start clutch. The motor torque is proportional to the amount of current flowing in the motor, and thus in order to enhance the control precision of the motor torque, it is required to enhance the current control precision of the motor (for example, see JP-A-2002-81472).

On the other hand, it is general that the current of a motor is detected by inserting a current detecting resistor into a bus. However, the motor current contains a higher harmonic component which is six times as high as the operating frequency, and the current value to be detected may be dispersed in accordance with sampling timing. When the current value is dispersed, a result of current feedback control becomes unstable. In order to prevent this problem, there has been proposed a technique of generating a interrupting signal every 60° in electrical angle and calculating active current and reactive current every interrupting timing or conducting moving average on current values within a period of 60° in electrical angle, whereby the higher harmonic component is removed and the stability of the current feedback control is enhanced (for example, see JP-A-2004-282969).

Furthermore, as another technique of detecting the current of a motor, there has been proposed a technique of using a brushless DC motor of a 120° rectangular wave energizing system and detecting energizing current of coils of respective phases of the brushless DC motor every signal switching timing of plural hall sensors for detecting the position of a rotor of the brushless DC motor with respect to a stator of the brushless DC motor, thereby suppressing the dispersion of the current value (for example, see JP-A-2000-166277).

However, in the technique disclosed in JP-A-2004-282969, no attention is paid to a case where the coils of the respective phases of the motor are dispersed in resistance, etc. Accordingly, when a current detection value when the coils of the respective phases of the motor are dispersed in resistance is used for feedback control, dispersion of current is increased as a control result.

Here, this problem will be described in detail.

FIG. 14 is a diagram showing a behavior when the coil resistances of the respective phases of the motor are dispersed from one another, and shows a current feedback control result when current is sampled at an edge timing of the hall sensor. In this case, a response when the U-phase coil, a V-phase coil and a W-phase coil are set to 50 mΩ, 60 mΩ, 40 mΩ in resistance will be described.

In FIG. 14, current is made to flow from the U-phase to the V-phase for the period from 0° to 60° in electrical angle, and thus the coil resistance is set to 110 mΩ. Subsequently, current is made to flow from the U-phase to the W-phase for the period from 60° to 120° in electrical angle, and thus the coil resistance is set to 90 mΩ. Subsequently, current is made to flow from the V-phase to the W-phase for the period from 120° to 180° in electrical angle, and thus the coil resistance is set to 100 mΩ. Subsequently, current is made to flow from the V-phase to the U-phase for the period from 180° to 240° in electrical angle, and thus the coil resistance is set to 110 mΩ. Subsequently, current is made to flow from the W-phase to the V-phase for the period from 240° to 300° in electrical angle, and thus the coil resistance is set to 90 mΩ. Subsequently, current is made to flow from the W-phase to the V-phase for the period from 300° to 360° in electrical angle, and thus the coil resistance is set to 100 mΩ. As in the case of the period from 0° to 60° in electrical angle, current is made to flow from the U-phase to the V-phase for the period from 360° to 420° in electrical angle, and thus the coil resistance is set to 110 mΩ. As described above, three resistance values of 110 mΩ, 90 mΩ and 100 mΩ are provided as the value of the coil resistance, and these three resistance values are successively repeated.

Furthermore, in the current feedback control, current is sampled at every timing of 60° electrical angle like 0°, 60°, 120° in electrical angle, and an instruction voltage, that is, a next instruction voltage subsequent to the sampling timing of the current is calculated by using the sampled current value. That is, current is sampled every 60° electrical angle, and instruction duty is renewed. A calculating equation executed every 60° electrical angle can be represented by the following equations (1) and (2) when the dispersion of the coil resistance is represented by K. However, these equations are examples, and thus the present invention is not limited to these equations.

Next instruction voltage=present instruction voltage+
(target current−detected current)×K  (1)

Instruction duty=next instruction voltage/power
source voltage×100  (2)

Here, a calculating method for the current feedback control when the target current is set to 30A and K is equal to 0.1 will be described.

First, the instruction voltage 2.64(V) is set for a period till the electrical angle of 0°, and the coil resistance is equal to 100 mΩ, so that the motor current when the electrical angle is equal to zero is equal to 26.4A. At this time, from the equation (1)

$$\text{Next instruction voltage} = 2.64 + (30.0 - 26.4) \times 0.1 = 3.00 \text{V}$$

Accordingly, current is made to flow into the motor while the instruction voltage for the period from 0° to 60° in electrical angle is equal to 3.00(V).

(State 1) Current is made to flow from the U-phase to the V-phase for the period from 0° to 60° in electrical angle, and thus the total coil resistance is equal to 110 mΩ. The instruction voltage is set to 3.00(V) as a calculation result of the current feedback, and thus the motor current at the electrical angle of 60° is equal to 27.3A.

Next, from the equation (1), the instruction voltage for the period from 60° to 120° in electrical angle is represented as follows:

$$\text{Next instruction voltage} = 3.00 + (30.0 - 27.3) \times 0.1 = 3.27 \text{V}$$

Accordingly, current is made to flow into the motor while the instruction voltage for the period from 60° to 120° in electrical angle is set to 3.27(V).

(State 2) Current is made to flow from the U-phase to the W-phase for the period from 60° to 120° in electrical angle, and thus the total coil resistance is equal to 90 mΩ. Since the instruction voltage is set to 3.27(V) as a current feedback calculation result, so that the motor current at the electrical angle of 120° is equal to 36.3A.

Next, from the equation (1), the instruction voltage for the period from 120° to 180° in electrical angle is represented as follows:

$$\text{Next instruction voltage} = 3.27 + (30.0 - 36.3) \times 0.1 = 2.64 \text{V}$$

Accordingly, current is made to flow into the motor while the instruction voltage for the period from 120° to 180° in electrical angle is set to 2.64(V).

(State 3) Current is made to flow from the V-phase to the W-phase for the period from 120° to 180° in electrical angle, and thus the total coil resistance is equal to 100 mΩ. Since the instruction voltage is set to 2.64(V) as a current feedback calculation result, so that the motor current at the electrical angle 180° is equal to 26.4A.

Next, from the equation (1), the instruction voltage for the period from 120° to 180° in electrical angle is represented as follows:

$$\text{Next instruction voltage} = 2.64 + (30.0 - 26.4) \times 0.1 = 3.00 \text{V}$$

Accordingly, current is made to flow into the motor while the instruction voltage for the period from 180° to 240° is set to 3.00(V).

As described above, by repeating the states 1 to 3, the motor current has a dispersed response as shown in FIG. 14. Here, the dispersion (variation) width 61 of the motor current is equal to 36.3A−26.4A=9.9A.

As described above, in the conventional current feedback control, the instruction voltage of the present energization phase is calculated from the detection current at the preceding energization phase. Therefore, when the difference in coil resistance between the preceding energization phase and the present energization phase is large, there occurs a phenomenon that the dispersion of the motor current is increased.

The motor current and the motor torque amount are proportional to each other, and thus when the motor current is dispersed, the torque amount of the motor is also dispersed.

As described above, in order to control the clutch engaging force with high precision, it is required to adjust the torque amount of the motor with high precision. Therefore, when current is dispersed and thus the torque amount is also dispersed, the engaging force of the clutch cannot be controlled with high precision. Accordingly, the limit value of the dispersion of the motor current is determined from the control precision of the clutch engaging force.

Here, it is generally known that the dispersion of current can be reduced by adjusting K described above. However, as shown in FIG. 15, when the dispersion of the motor current is reduced by setting K to a smaller value, there occurs a problem that a convergence time required for the current to reach motor target current is increased. When the follow-up performance to the current target value is lost, there occurs such a phenomenon that it becomes impossible to transmit torque when the motor current target value is increased to enhance the clutch engaging force in the control of the clutch engaging force.

Accordingly, in order to avoid the above problem, a predetermined threshold value is set for the convergence time to the motor target current. From FIG. 15, in the conventional current feedback control, the dispersion of the motor current is equal to δ1 when the convergence time is equal to a threshold value. As described above, in the conventional current feedback control, it is impossible to set a motor target current following time within the threshold value of the convergence time while the dispersion of the motor current is kept within a predetermined value.

Furthermore, in the control device of a DC motor of the 120° rectangular wave energizing system disclosed in JP-A-2000-166277, the dispersion of the current value is suppressed by detecting the motor current at the signal switching timing of the hall sensor. However, in this case, when the signal variation timing of the hall sensor is unequally angularly spaced with respect to "every 60° in electrical angle", the current detection value is dispersed. Here, the response of the motor current is minimized at the switching time of the energization phase, and then gradually increases. Therefore, when the current detection timing is dispersed, gradually increasing current is sampled, so that the current detection value is dispersed. Actually, there are dispersion of installation of the hall sensor and characteristic dispersion, so that the signal variation interval of the hall sensor is unequal and thus the detection current value is dispersed. Accordingly, the current feedback control is unstable.

As described above, in the related arts, the feedback control precision is unstable, the current control precision is low and the clutch engaging force cannot be precisely controlled. Accordingly, the clutch engaging force is unstable, and the travel state of a vehicle is unstable.

For the purpose of suppressing the dispersion of the detection current value, oscillation of a current signal may be suppressed by increasing the time constant of a filter circuit. However, in this case, the variation of the motor current value is also slackened, and this causes a risk that instantaneous response performance is deteriorated.

SUMMARY OF THE INVENTION

The present invention has been implemented to solve the above problems, and has an object to provide a control device for an automatic transmission which can enhance the control precision of current feedback of a motor without slackening variation of a motor current value, and control clutch engaging force with high precision, thereby securing safety of a vehicle and feeling.

In order to attain the above object, according to the present invention, a control device for controlling an automatic transmission in which driving power of an engine is transmitted to a gear shift mechanism through a clutch, engaging force of the clutch being adjusted by a motor, includes a motor control unit for controlling the rotation of the motor. The motor control unit has a motor target current calculating unit for calculating target current in the motor, a current detecting resistor for detecting motor current flowing when the motor rotates, and a current detecting unit for sampling a voltage occurring in the current detecting resistor to detect the motor current. The current detecting unit has a counter for counting a variation number of a rotational position signal output from a rotational position detecting unit for detecting the rotational position of the motor, and an electrical angle 180° judging unit for judging on the basis of the count value of the counter that the motor rotates at 180° in electrical angle. The voltage occurring in the current detecting unit is sampled every timing corresponding to an integral multiple of 180° in electrical angle that is detected by the electrical angle 180° judging unit, and the rotation of the motor is controlled in accordance with the difference between the motor target current calculated by the motor target current calculating unit and the motor current.

According to the present invention, the engaging force of the clutch can be controlled with high precision by enhancing the current feedback control precision of the motor, and thus the stable travel state of a vehicle can be secured.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 10 is a flowchart showing the operation of the automatic transmission control device according to the third embodiment;

FIG. 11 is a block diagram showing a current detecting unit constituting an automatic transmission control device according to a fourth embodiment;

DETAILED DESCRIPTION OF THE PREFERRED EMBODIMENTS

Preferred embodiments of an automatic transmission control device according to the present invention will be described hereunder with reference to the accompanying drawings, however, the present invention is not limited to these embodiments.

First Embodiment

Figure 1:
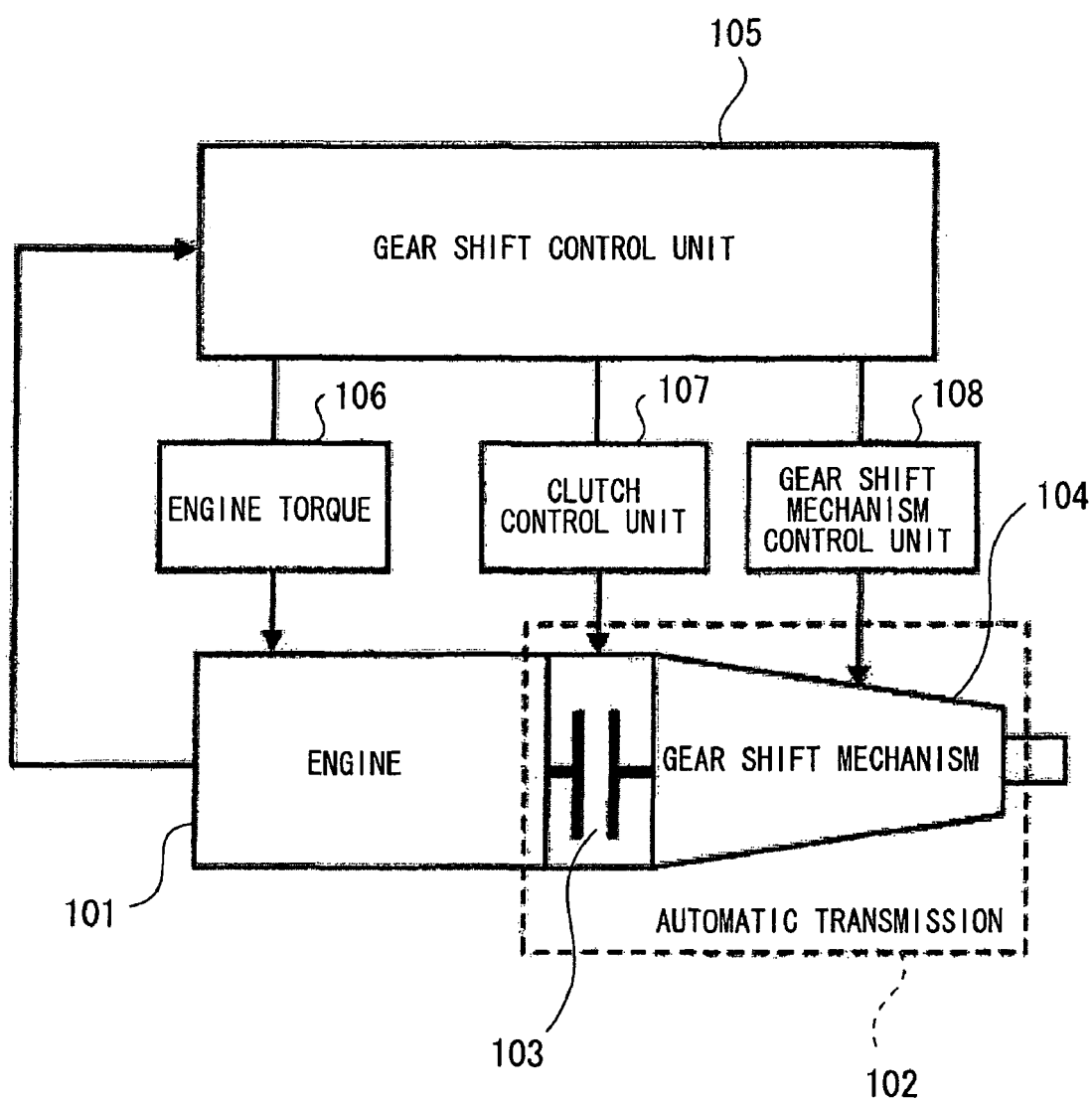
FIG. 1 is a diagram showing the system construction of a control device for an automatic transmission according to a first embodiment of the present invention.

FIG. 1 is a diagram showing the system construction of an automatic transmission control device according to a first embodiment of the present invention. In FIG. 1, an engine 101 and an automatic transmission 102 are joined to each other by a clutch 103. The clutch 103 is fixed to an input portion of the automatic transmission 102, and transmits driving power from the engine 101 to the automatic transmission 102. The automatic transmission 102 is provided with a gear shift mechanism 104 for changing a shift gear stage of the automatic transmission 102.

A gear shift control unit 105 controls the shift gear stage of the automatic transmission 102 by engaging the clutch 103 of the automatic transmission 102 and changing the construction of the gear shift mechanism 104. An engine torque control unit 106 controls the torque amount of the engine at the gear shift time on the basis of an instruction of the gear shift control unit 105. A clutch control unit 107 contains a motor control unit described later, and controls the clutch at the gear shift time and the engaging force of the clutch on the basis of an instruction of the gear shift control unit 105. Furthermore, a gear shift mechanism control unit 108 controls the shift gear stage of the gear shift mechanism 104 on the basis of an instruction of the gear shift control unit 106. The clutch control unit 107 is designed as a mechanism in which the rotational angle of a brushless motor described later is proportional to the stroke amount of the clutch 103, and the clutch engaging force is adjusted by controlling the torque of the brushless motor to adjust the rotational angle.

Here, when the engaging force of the clutch 103 becomes unstable, the driving power transmitted from the engine 101 to the gear shift mechanism 104 becomes unstable, and finally the driving power transmitted to the wheels becomes unstable. Therefore, a vehicle, for example, a car falls into an unstable travel state, which makes a driver feel uncomfortable.

Next, the motor control unit contained in the clutch control unit 107 will be described.

Figure 2:
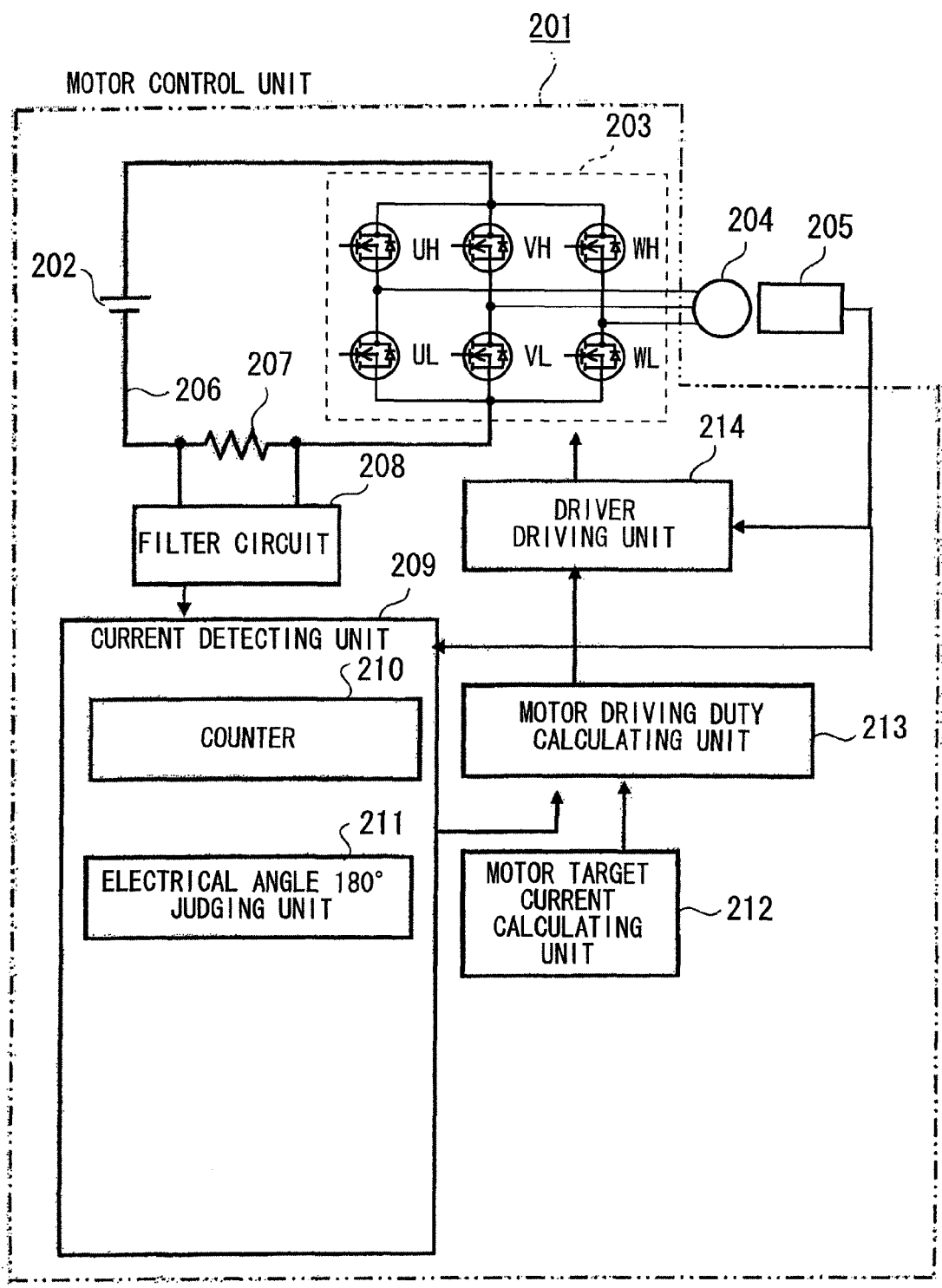
FIG. 2 is a block diagram showing a motor control unit constituting the automatic transmission control device according to the first embodiment of the present invention.

FIG. 2 is a block diagram showing the motor control unit. In FIG. 2, reference numeral 201 represents the motor control unit, and the motor control unit 201 is constructed as follows.

A battery 202 supplies current to a brushless motor 204 through an inverter 203, whereby the rotor (not shown) of the brushless motor 204 rotates.

The brushless motor 204 is provided with a rotational position detecting unit, for example, a hall sensor 205 for detecting the position of the rotor with respect to the stator (not shown) of the brushless motor 204, that is, the rotational position of the brushless motor 204. The hall sensor 205 generates a hall sensor signal which corresponds to the position of the rotor with respect to the stator of the brushless motor 204 as described above.

Furthermore, a current detecting resistor (hereinafter referred to as "shunt resistor") 207 is inserted into a bus 206 through which the battery 202 and the inverter 203 are connected to each other, and when the brushless motor 204 rotates to make current flow, a potential difference occurs between both the ends of the shunt resistor 207. This potential difference is filtered by a filter circuit 208 to transmit a voltage signal to the current detecting unit 209. In the current detecting unit 209, a current value is calculated on the basis of data obtained by subjecting the transmitted voltage signal to A/D conversion every edge of the hall sensor signal.

The current detecting unit 209 is provided with a counter 210 for counting the number of edges of the hall sensor signal, and also provided with an electrical angle 180° judging unit 211 for judging on the basis of the count value of the counter 210 that the brushless motor 204 rotates by the electrical angle of 180°.

The current value calculated by the current detecting unit 209 and the target current value of the brushless motor 204 calculated by a motor target current calculating unit 212 are output to a motor driving duty calculating unit 213 to calculate a motor driving duty, and the calculation result is transmitted to a driver driving unit 214.

The driver driving unit 214 generates gate signals of six FETs constituting the inverter 203, that is, UH, UL, VH, VL, WH, WL from the motor driving duty calculated in the motor driving duty calculating unit 213 and the hall sensor signal. Each FET carries out a switching operation in accordance with the generated gate signal to control the current of the U-phase, the V-phase and the W-phase of the brushless motor 204, whereby the rotation of the brushless motor 204 is controlled.

Next, a control method for the current to be supplied to the brushless motor 204 will be described.

Figure 3:
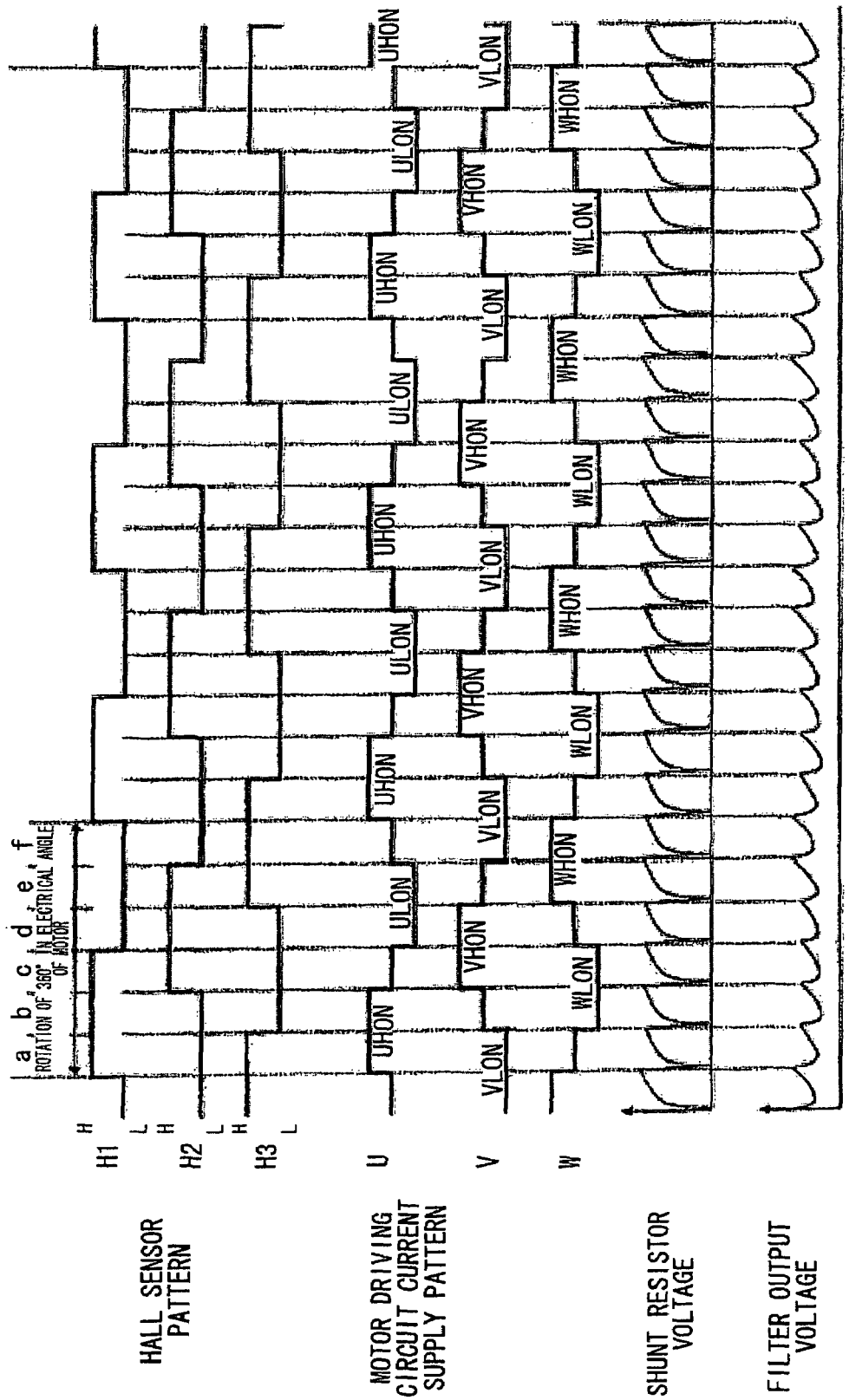
FIG. 3 is a diagram showing a method of controlling current supplied to a brushless motor by the automatic transmission control device according to the first embodiment of the present invention.

FIG. 3 is a diagram showing the signal pattern of the hall sensor 205, the current supply pattern to the brushless motor 204, the voltage between both the ends of the shunt resistor 207 and the output voltage of the filter circuit 208.

As described above, the hall sensor 205 is mounted in the brushless motor 204, and the hall sensor 205 generates signals represented by the hall sensor patterns H1, H2, H3 of FIG. 3 in accordance with the position of the rotor with respect to the stator of the brushless motor 204.

In the driver driving unit 214, a current pattern represented by U, V, W of the motor driving circuit current supply pattern of FIG. 3 is generate by the combination of the signals of the hall sensor 205. When this current pattern U, V, W is supplied to the brushless motor 204, the brushless motor 204 rotates in one direction.

For example, a period a corresponds to the combination of "H" in the hall sensor H1, "L" in the hall sensor H2 and "H" in the hall sensor H3. At this time, the gate signals of UH and VL out of the respective FETs of the inverter 203 are instructed to be set to ON, whereby current flows from the U-phase to the V-phase in the brushless motor 204.

Subsequently, the signal pattern of the hall sensor 205 of a period b corresponds to the combination of "H" in the hall sensor H1, "L" in the hall sensor H2 and "L" in the hall sensor H3. At this time, the gate signals of UH and WL out of the respective FETs of the inverter 203 are instructed to be set to ON, whereby current flows from the U-phase to the W-phase in the brushless motor 204.

Subsequently, the signal pattern of the hall sensor 205 of a period c corresponds to the combination of "H" in the hall sensor H1, "H" in the hall sensor H2 and "L" in the hall sensor H3. At this time, the gate signals of VH and WL out of the respective FETs of the inverter 203 are instructed to be set to ON, whereby current flows from the V-phase to the W-phase of the brushless motor 204.

Subsequently, the signal pattern of the hall sensor 205 of a period d corresponds to the combination of "L" in the hall sensor H1, "H" in the hall sensor H2 and "L" in the hall sensor H3. At this time, the gate signals of VH and UL out of the respective FETs of the inverter 203 are instructed to be set to ON, whereby current flows from the v-phase to the U-phase of the brushless motor 204.

Subsequently, the signal pattern of the hall sensor 205 of a period e corresponds to the combination of "L" in the hall sensor H1, "H" in the hall sensor H2 and "H" in the hall sensor H3. At this time, the gate signals of WH and UL out of the respective FETs of the inverter 203 are instructed to be set to ON, whereby current flows from the W-phase to the U-phase of the brushless motor 204.

Subsequently, the signal pattern of the hall sensor 205 of a period f varies to the combination of "L" in the hall sensor H1, "L" in the hall sensor H2 and "H" in the hall sensor H3. At this time, the gate signals of WH and VL out of the respective FETs of the inverter 203 are instructed to be set to ON, whereby current flows from the W-phase to the V-phase of the brushless motor 204.

As described above, the six kinds of current supply patterns to the brushless motor 204 of the periods a to f are successively repeated like "a→b→c→d→e→f→a", whereby the brushless motor 204 rotates.

Furthermore, the number of rising edges and falling edges of the hall sensors H1, H2, H3 between the period a and the period f is equal to six for the rotation of the brushless motor 204 over the electrical angle of 360°. That is, an edge occurs every 60° in electrical angle.

Next, the shunt resistance voltage and the filter output voltage of FIG. 3 will be described.

When current is supplied to the brushless motor 204 in the six kinds of current supply patterns described above, the motor current corresponding to the duty flows into the brushless motor 204. The voltage between both the ends of the shunt resistor 207 varies in accordance with the amount of the flowing current, however, voltage drop occurs in the shunt resistor voltage shown in FIG. 3 every switching timing of the current-flowing phase. Furthermore, in the motor control unit 201, when current is detected, the shunt resistor voltage is subjected to noise removal by the filter circuit 208 and processed. However, oscillation remains in the voltage waveform like a filter output voltage shown in FIG. 3. Therefore, the current is subjected to A/D conversion every edge timing of the hall sensor 205 to remove the oscillation component.

Here, when the current is calculated, the filter output voltage is subjected to A/D conversion, and the data thereof are taken into a computer or the like, multiplied by a coefficient and set as a current value.

Figure 4:
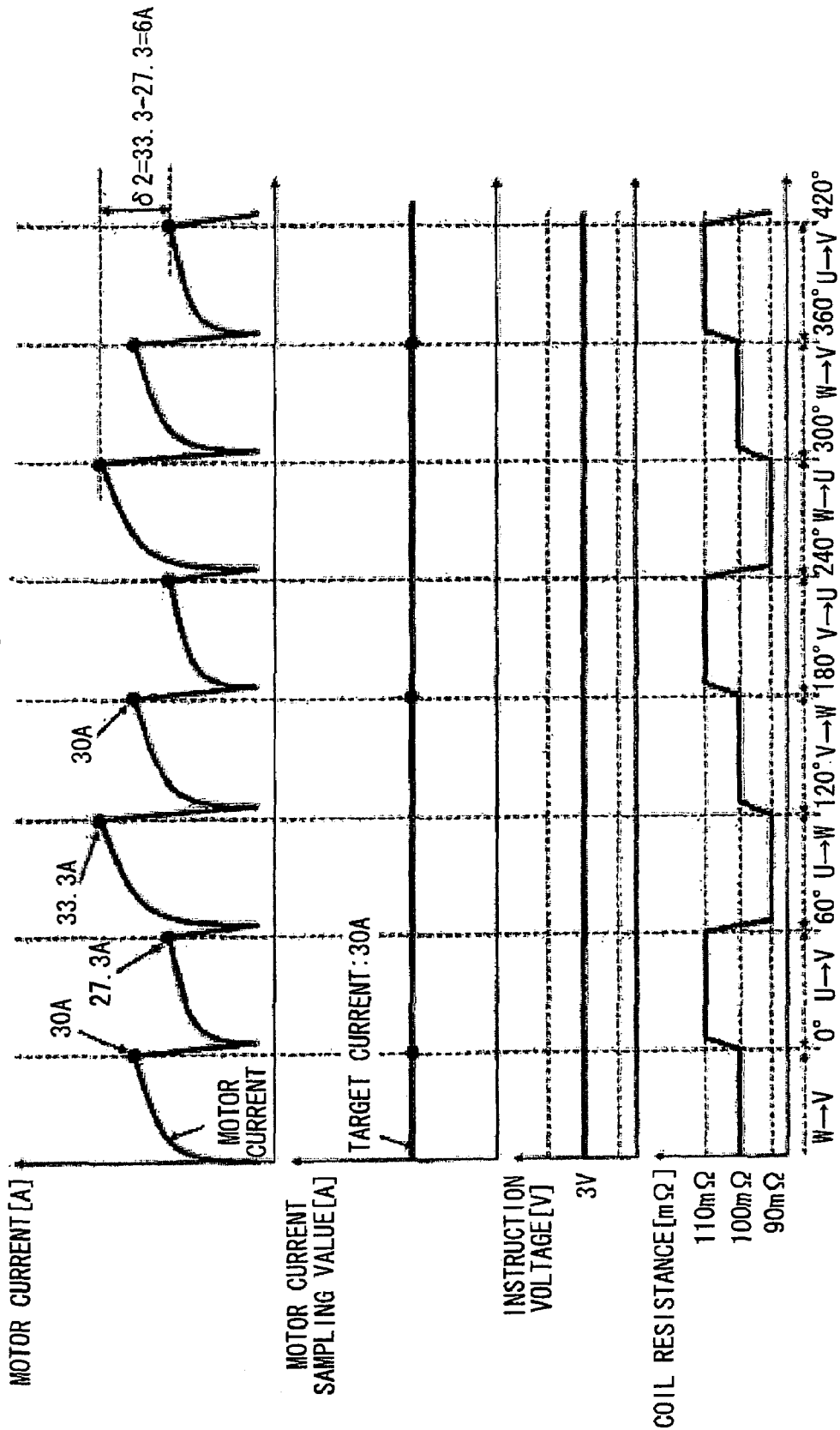
FIG. 4 is a diagram showing a current feedback control result in the automatic transmission control device according to the first embodiment.
Figure 14:
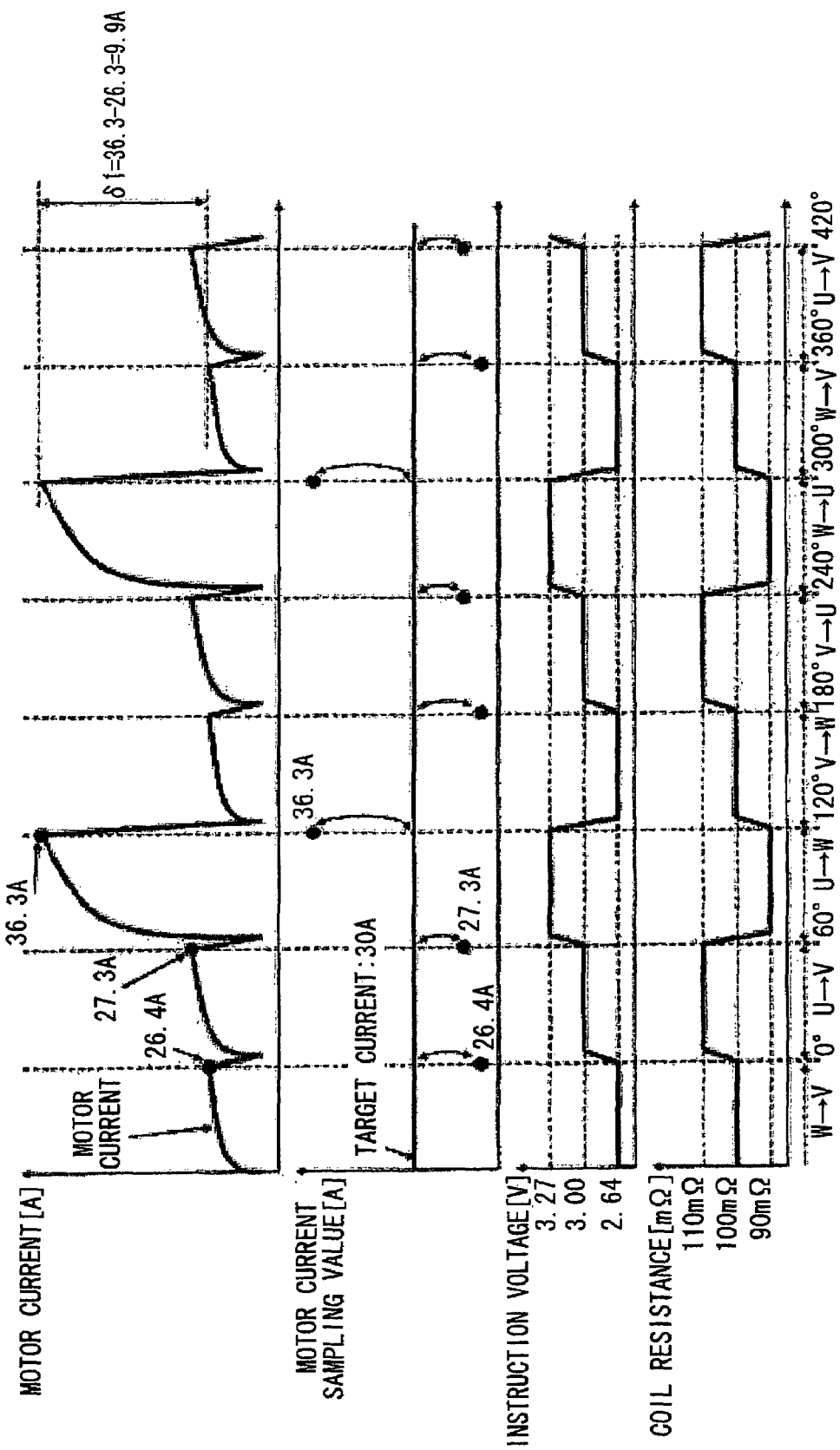
FIG. 14 is a diagram showing a current feedback control result of a conventional automatic transmission control device.
Figure 15:
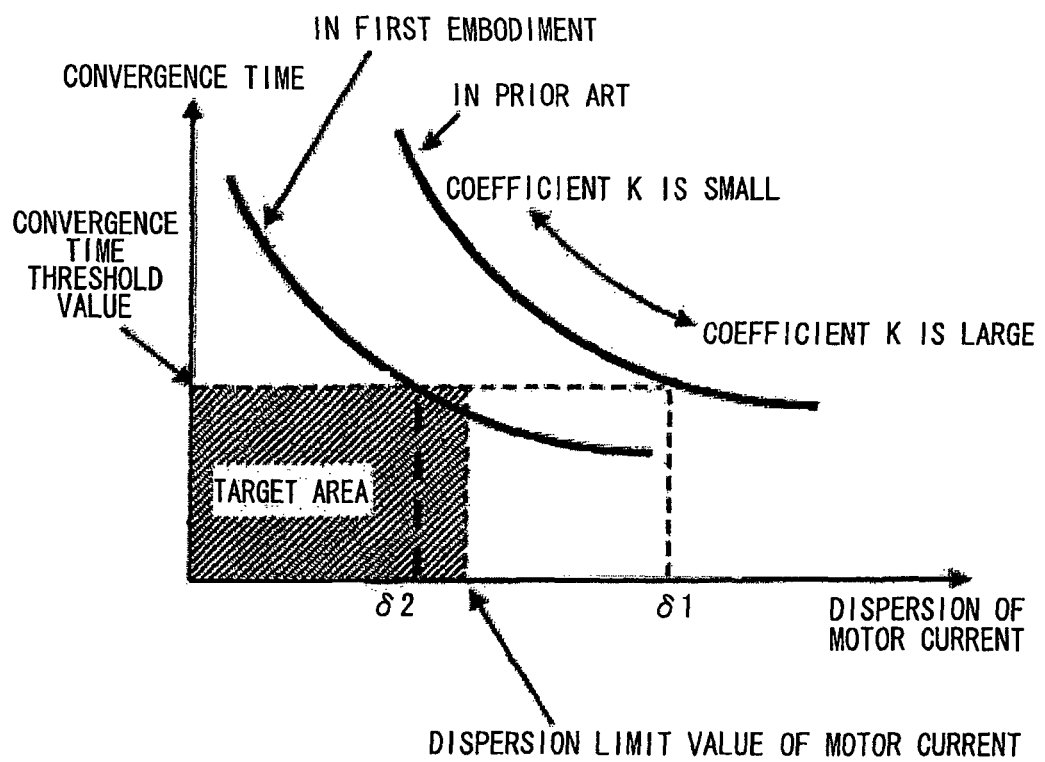
FIG. 15 is a diagram showing the relationship between the dispersion of motor current and the convergence time to target current in the conventional automatic transmission control device.

FIG. 4 is a diagram showing a current feedback control result in the control device for the automatic transmission according to the first embodiment, and this diagram corresponds to that of FIG. 14 with which the related art is described. A response when current is sampled every 180° in electrical angle and current flowing in the V-phase and W-phase coils is sampled will be described hereunder, and current may be detected at the timing corresponding to an integral multiple of the electrical angle of 180°. It is assumed that the target current is equal to 30A and K=0.1.

In FIG. 4, the timing of the current detection is set to each electrical angle of 180°, and thus current is sampled at the timing of 0°, 180° and 360° in electrical angle.

The current at the electrical angle of 0° is coincident with the target current, and it is equal to 30.0A. Accordingly, from the equation (1), Next instruction voltage=3.00+(30.0−30.0)× 0.1=3.00V The instruction voltage for the period between 0° and 60°, the period between 60° and 120° and the period between 120° and 180° in electrical angle is equal to 3.00(V), and thus it keeps the previous instruction voltage.

In this case, current is made to flow from the U-phase to the V-phase for the period between 0° and 60° in electrical angle, and thus the total coil resistance is equal to 110 mΩ. The instruction voltage is set to 3.00(V) as a current feedback calculation result, and thus the motor current at the electrical angle of 60° is equal to 27.3A.

Furthermore, current is made to flow from the U-phase to the W-phase for the period between 60° and 120° in electrical angle, and thus the total coil resistance is equal to 90 mΩ. Since the instruction voltage is set to 3.00(V) as a current feedback calculation result, the motor current at the electrical angle of 120° is equal to 33.3A.

Current is made to flow from the V-phase to the W-phase for the period between 120° and 180° in electrical angle, and thus the total coil resistance is equal to 100 mΩ. Since the instruction voltage is set to 3.00(V) as a current feedback calculation result, the motor current at the electrical angle of 180° is equal to 30.0A.

Next, the motor current at the electrical angle of 180° is sampled, and the next instruction voltage is calculated from the equation (1).

As described above, when the dispersion width $\delta 2$ of the motor current is calculated in the example shown in FIG. 4, $\delta 2$=33.3−27.3=6.0A. Accordingly, as compared with the dispersion width $\delta 1$ (=10.0A) of the motor current under the conventional current feedback control, the dispersion of the motor current can be reduced according to the control device for the automatic transmission according to the first embodiment.

Figure 5:
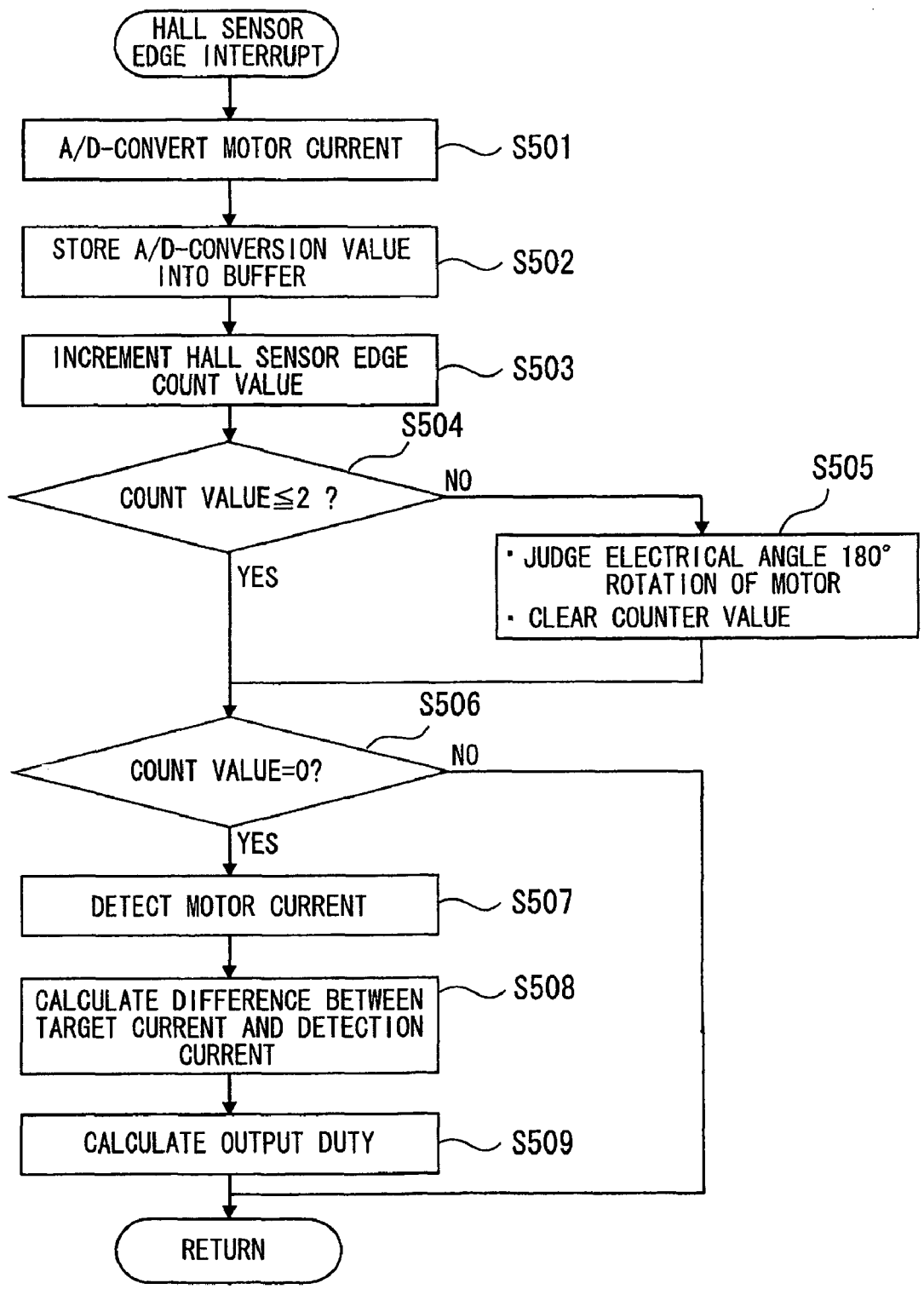
FIG. 5 is a flowchart showing the operation of the automatic transmission control device according to the first embodiment.

Next, the actual operation of the control device for the automatic transmission according to the first embodiment will be described with reference to the flowchart of FIG. 5. FIG. 5 is a flowchart showing the operation of the control device for the automatic transmission according to the first embodiment, and shows a case where the sampling timing of the current value is set to every 180° in electrical angle. This device operates in response to an interrupt of each edge signal of the hall sensor 205 mounted in the brushless motor 204.

First, in step S501, the motor current is subjected to A/D conversion, and the A/D-converted data are stored into a buffer in step S502.

Subsequently, in step S503, the edge count value of the hall sensor 205 is incremented.

Subsequently, the processing goes to step S504, and judges the previously counted edge count value. Here, when the count value is equal to three (thrice) or more, the processing goes to the judgment "No", and it is judged in step S505 that the brushless motor 204 rotates at the electrical angle of 1800. At the same time, the count value is cleared, and the processing goes to step S506. On the other hand, when the count value is equal to two (twice) or less, the processing goes to the judgment "Yes", and further goes to step S506.

Subsequently, it is judged in step S506 whether the count value is equal to zero or not. When the count value is equal to zero, the processing goes to the judgment "Yes", the motor current is calculated in step S507 and then the processing goes to step S508. On the other hand, when the count value is not equal to zero, the processing goes to the judgment "No", and the hall edge interrupt processing routine is finished. The steps S501 to S507 are executed by the current detecting unit 209.

In step S508, the difference between the motor target current set in the motor target current calculating unit 212 and the motor detection current detected by the current detecting unit 209 is calculated.

Subsequently, the processing goes to step S509, the output duty is calculated in accordance with the difference calculated in step S508, and the hall edge interrupt processing routine is finished. The steps S508 and S509 are executed in the motor driving duty calculating unit 213.

As described above, the motor current is detected and the output duty is calculated every time the hall edge interrupt is made thrice, that is, every time the brushless motor 204 rotates by 180° in electrical angle. The calculated output duty is output to the inverter 203 through the driver driving unit 214, and the rotation of the brushless motor 204 is controlled.

As described in detail, according to the control device for the automatic transmission of the first embodiment, the dispersion of the motor current can be suppressed for the conventional device, and the torque dispersion of the clutch 103 can be reduced. Accordingly, the engaging force of the clutch 103 can be controlled with high precision, the driving power transmitted to the wheels is stabilized and excellent travel performance can be implemented without making a driver feel uncomfortable.

Second Embodiment

Next, a control device for an automatic transmission according to a second embodiment of the present invention will be described.

In the first embodiment, the description is made on the embodiment of securing the stability of the motor current when the coil resistance is dispersed among the respective phases of the brushless motor. According to the second embodiment, the current feedback control is performed by using the average value of the detection values of the motor current, whereby the average current of the brushless motor is made to follow a target current to make the average torque of the brushless motor follow a target torque.

Figure 6:
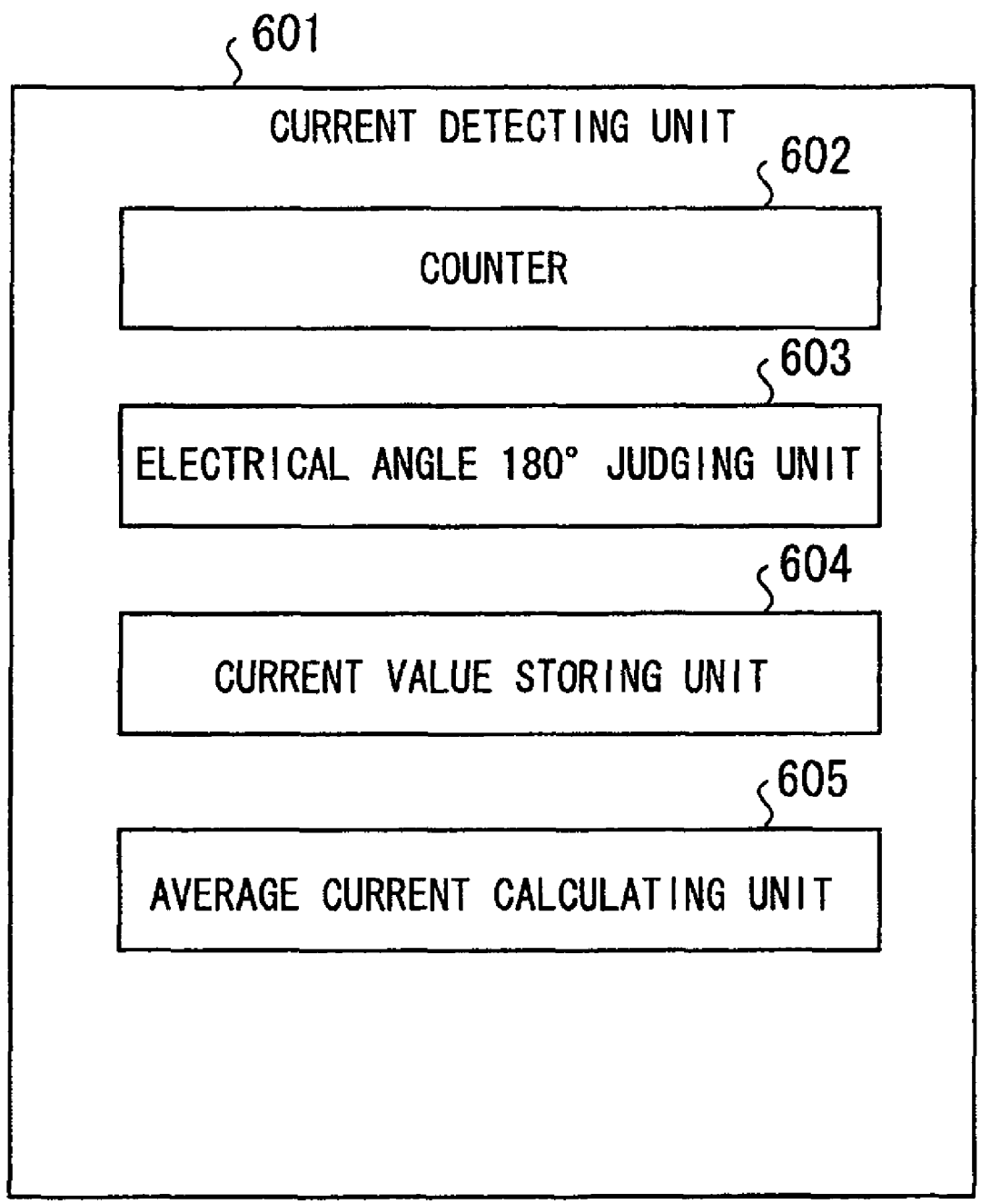
FIG. 6 is a block diagram showing a current detecting unit constituting an automatic transmission control device according to a second embodiment.

The control device for the automatic transmission according to the second embodiment uses a current detecting unit 601 shown in FIG. 6 in place of the current detecting unit 209 constituting the motor control unit 201 described in the first embodiment, and the other construction is the same as the first embodiment. In the following description, FIG. 1 or FIG. 2 is properly referred to.

The current detecting unit 601 used in the control device for the automatic transmission according to the second embodiment is provided with a counter 602 for counting the number of edges of a hall sensor signal, and an electrical angle 180° judging unit 603 for judging on the basis of the count value that the brushless motor 204 rotates by 180° in electrical angle. Furthermore, the current detecting unit 601 is provided with a current value storing unit 604 for storing a current value calculated on the basis of A/D-converted data every edge of the hall sensor signal and an average current calculating unit 605 for calculating an average value from data stored in the current value storing unit 604.

The control device for the automatic transmission according to the second embodiment is constructed as described above, and the operation thereof will be next described. In the following description, the hall sensor signal for the electrical angle of 180° is counted by the counter 602, and only current detection values whose number corresponds to the count value are stored. However, only current detection values whose corresponds to an integral multiple of the count value of the counter 602 may be stored.

First, in the control device for the automatic transmission according to the first embodiment, current is sampled at the timing of each integral multiple of the electrical angle of 180° (the integer is equal to 1) like 0°, 180° and 360° in electrical angle to perform the feedback control as shown in FIG. 4. Accordingly, the current value at the timing at which current is sampled follows the target current. However, when paying attention to the edge switching timing of each hall sensor signal, that is, the current value at every 60° in electrical angle, the motor current at the electrical angle of 0° is equal to 30A, the motor current at the electrical angle of 60° is equal to 27.3A and the motor current at the electrical angle of 120° is equal to 33.3A, so that the motor average current is equal to 30.2A and thus this value is not coincident with the target current (30A).

Therefore, in the control device for the automatic transmission according to the second embodiment, the instruction voltage is calculated so that the average value of the motor current of 0°, 60° and 120° in electrical angle follows the target current. In the following description, it is assumed that the target current is set to 30A and K=0.1.

Here, a calculating equation for the next instruction voltage used in the control device for the automatic transmission according to the second embodiment is as follows.

Next instruction voltage=present instruction voltage+
(target current−motor average current)×$K$    (3)

Motor average current={motor current at electrical
angle of $x°$+motor current of electrical angle of
$(x+60)°$+motor current of electrical angle of
$(x+120)°$}/3    (4)

(here, x=0, 180, 360)

Figure 7:
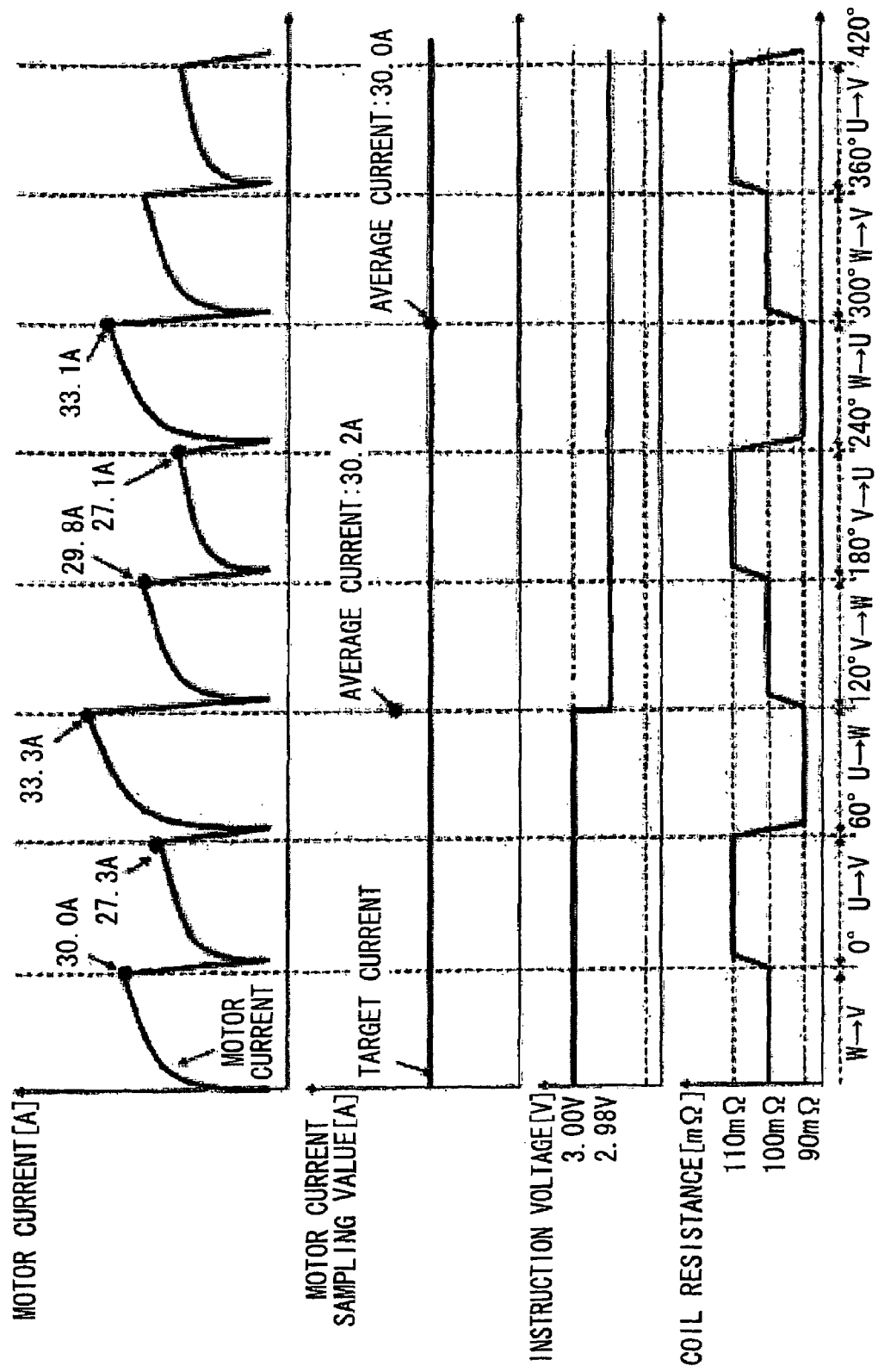
FIG. 7 is a diagram showing a current feedback control result in the automatic transmission control device according to the second embodiment.

FIG. 7 is a diagram showing a current feedback control result in the control device for the automatic transmission according to the second embodiment, and it shows a state that the instruction voltage is stabilized to 3.00V and then the control is started at the electrical angle of 0°.

In FIG. 7, the motor current is first sampled. The motor current at the electrical angle of 0° is equal to 30 A, the motor current at the electrical angle of 60° is equal to 27.3A, and the motor current at the electrical angle of 120° is equal to 33.3A. Accordingly, the motor average current is equal to 30.2A from the equation (4). Then, from the equation (3), Next instruction voltage=3.00+(30.0−30.2)×
0.1=2.98V The instruction voltage subsequent to the electrical angle of 120° is equal to 2.98V.

Current is made to flow from the V-phase to the W-phase for the period between 120° and 180° in electrical angle, and thus the total coil resistance is equal to 100 mΩ. Accordingly, the instruction voltage is set to 2.98(V) as a current feedback calculation result, and thus the motor current at the electrical angle of 180° is equal to 29.8A.

Furthermore, current is made to flow from the V-phase to the U-phase for the period between 180° and 240°, and thus the total coil resistance is equal to 110 mΩ. Since the instruction voltage is set to 2.98(V), and thus the motor current at the electrical angle of 240° is equal to 27.1A.

Furthermore, current is made to flow from the W-phase to the U-phase for the period between 240° and 300°, and thus the total coil resistance is equal to 90 mΩ. Since the instruction voltage is equal to 2.98(V), the motor current at the electrical angle of 300° is equal to 33.1A.

Next, the motor current at the electrical angle of 180° is equal to 29.8A, the motor current at the electrical angle of 240° is equal to 27.1A, the motor current at the electrical angle of 300° is equal to 33.1A, and the motor average current is equal to 30.0A from the equation (4). Furthermore, from the equation (3), Next instruction voltage=2.98+(30.0−30.0)×
0.1=2.98V Therefore, the instruction voltage subsequent to the electrical angle 300° is equal to 2.98V.

The above operation is repeated, and the motor average current is equal to 30.0A. Accordingly, according to the control device of the automatic transmission of the second embodiment, the motor average current follows the target current.

Figure 8:
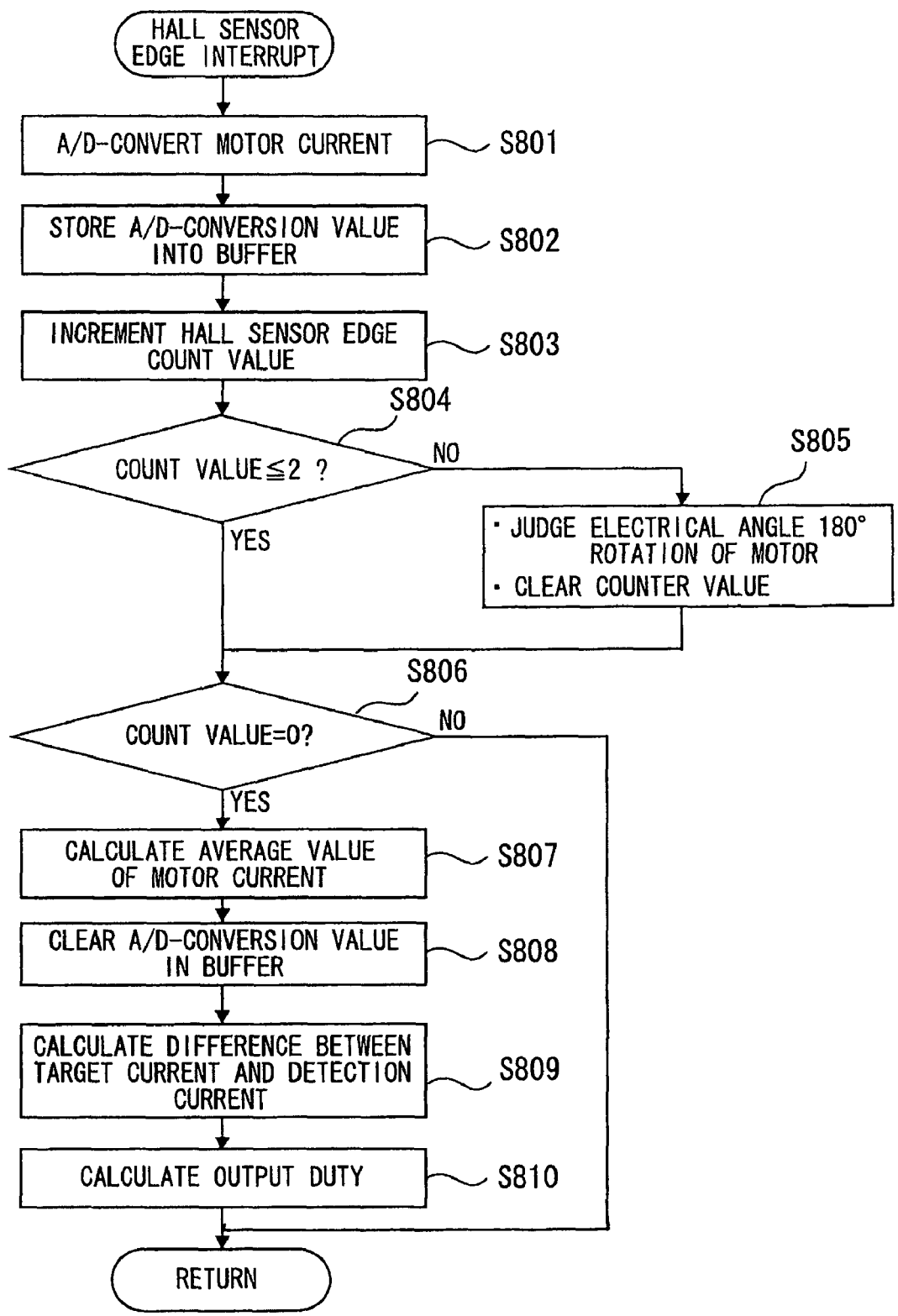
FIG. 8 is a flowchart showing the operation of the automatic transmission control device according to the second embodiment.

Next, the actual operation of the control device for the automatic transmission according to the second embodiment will be described with reference to a flow chart. FIG. 8 is a flowchart showing the operation of the control device for the automatic transmission according to the second embodiment. This device operates on the basis of interrupt of each edge signal of the hall sensor 205 mounted in the brushless motor 204.

First, in step S801, the motor current is subjected to A/D conversion, and the A/D-converted data are stored into the buffer in step S802.

Subsequently, in step S803, the edge count value of the hall sensor 205 is incremented.

Subsequently, the processing goes to step S804, and judges the previously counted edge count value. Here, when the count value is equal to three (thrice) or more, the processing goes to the judgment "No", and it is judged in step S805 that the brushless motor 204 rotates by 180° in electrical angle. At the same time, the counter value is cleared, and the processing goes to step S806. On the other hand, when the count value is equal to two (twice) or less, the processing goes to the judgment "Yes", and further goes to step S806.

Subsequently, in step S806, it is judged whether the count value is equal to zero or not. When the count value is not equal to zero, the processing goes to the judgment "No", and the hall edge interrupt processing routine is finished. On the other hand, when the count value is equal to zero, the processing goes to the judgment "Yes", and the motor average current is calculated from the data which are previously stored in step S807.

Subsequently, the processing goes to step S808, the buffer in which the A/D conversion value is stored is cleared, and then the processing goes to step S809. The steps S801 to S808 are executed by the current detecting unit 601.

In step S809, the difference between the motor target current set by the motor target current calculating unit 212 and the motor detection current detected by the current detecting unit 601 is calculated.

Subsequently, the processing goes to step S810, the output duty is calculated in accordance with the difference calculated instep S809, and the hall edge interrupt processing routine is finished. The steps S809 and S810 are executed by the motor driving duty calculating unit 213. The calculated output duty is output to the inverter 203 through the driver driving unit 214, and the rotation of the brushless motor 204 is controlled.

As described above, according to the control device for the automatic transmission according to the second embodiment, the motor current average value is calculated every time the hall edge interrupt is made thrice, that is, every time the brushless motor 204 rotates by 180° in electrical angle, the motor average current over the electrical angle of 180° can be made to follow the target current. The motor current average follows the target current, whereby the average torque of the brushless motor 204 follows the target torque. Therefore, the torque control precision can be enhanced, and the travel state of a vehicle such as a car or the like can be kept stable.

Third Embodiment

Next, the control device for the automatic transmission according to a third embodiment will be described.

In the control device for the automatic transmission according to the third embodiment, when the current average value over the electrical angle of 180° is calculated, a current value which is sampled at a detection timing of the latest hall sensor signal variation is set as the latest data, and the current average value is calculated from past three data. That is, a current value which is sampled at a timing at which the latest hall sensor signal variation is detected is set as the latest data, and past three data are stored into the current value storing unit 604 of FIG. 6 described in the second embodiment. Accordingly, the current average value over the electrical angle of 180° can be renewed every 60° in electrical angle, and the following performance when the target current varies can be enhanced. The other construction is the same as the second embodiment, and the description thereof is omitted.

Figure 9A:
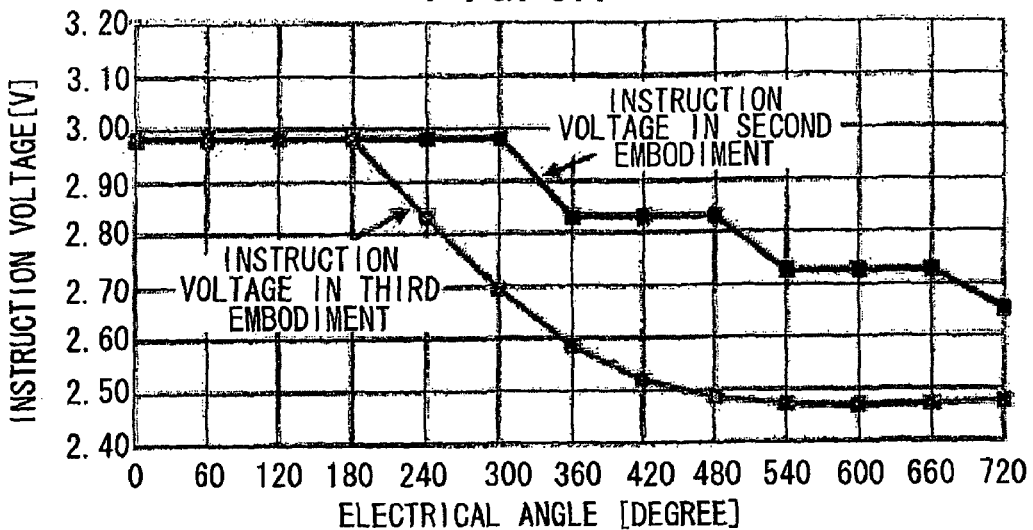
FIGS. 9A to 9C are diagrams showing the comparison between the operation of an automatic transmission control device according to a third embodiment and the operation of the automatic transmission control device according to the second embodiment.
Figure 9B:
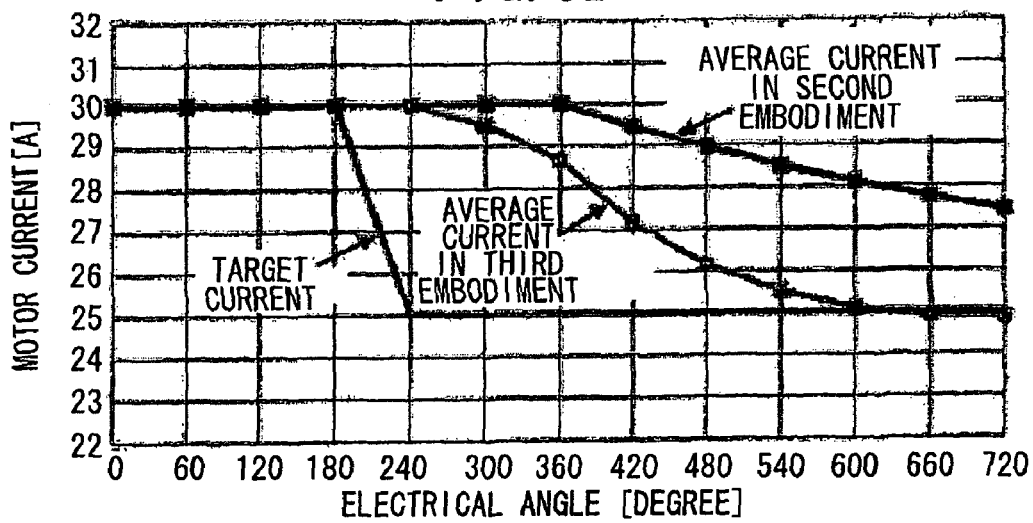
Figure 9C:
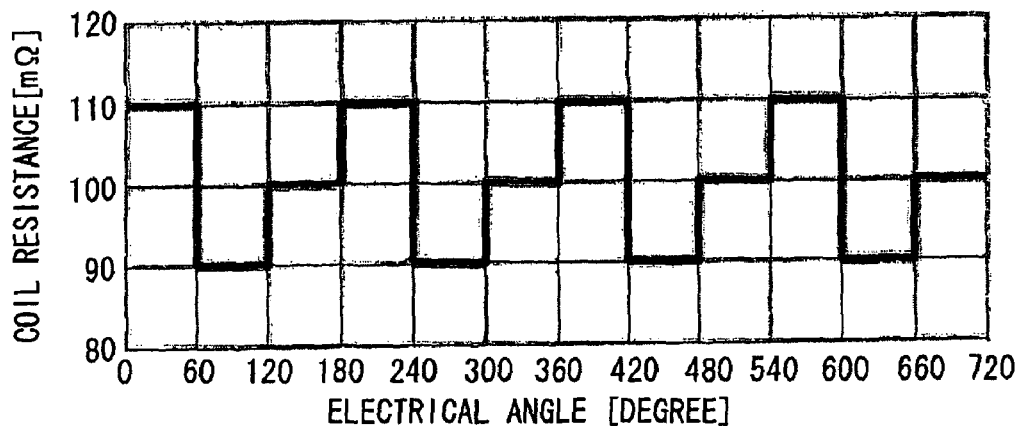

Next, the operation of the control device for the automatic transmission according to the third embodiment will be described while compared with the operation of the control device for the automatic transmission according to the second embodiment. In the following description on the operation of the control device for the automatic transmission according to the third embodiment, as in the case of the control device for the automatic transmission according to the second embodiment, current detection values whose number corresponds to the count value of the counter 602 for counting the hall sensor signal for the electrical signal of 180° are stored. However, only current detection values whose number corresponds to an integral multiple of the count value of the counter 602 may be stored FIGS. 9A to 9C are diagrams showing the operation of the control device for the automatic transmission according to the third embodiment in comparison with the operation of the control device for the automatic transmission according to the second embodiment. Here, the target current is changed from 30A to 25A when the electrical angle is equal to 240°. K used in the equation (3) is set to 0.03, and the renewing timing of the control is set to every 180° in electrical angle like 0°, 180°, 360°, 540°, etc. FIG. 9A shows the variation of the instruction voltage with respect to the electrical angle, FIG. 9B shows the variation of the motor current with respect to the electrical angle, and FIG. 9C shows the variation of the coil resistance with respect to the electrical angle.

In FIG. 9, the target current is changed at the timing of 240° in electrical angle. However, in the case of the control device for the automatic transmission according to the second embodiment, the instruction voltage is renewed every 180° like 0°, 180°, 360°, etc. Accordingly, even when the target current is changed at the electrical angle of 240°, the instruction voltage cannot be renewed till the electrical angle reaches 360°. The control operation of the control device for the automatic transmission according to the second embodiment which uses actual numerical values will be described.

First, the motor average current at the electrical angle of 360° is calculated. The motor current at the electrical angle of 360° is equal to 29.8A because the instruction voltage is equal to 2.98V and the coil resistance is equal to 100 mΩ. The motor current at the electrical angle of 300° is equal to 33.1A because the instruction voltage is equal to 2.98V and the coil resistance is equal to 90 mΩ. The motor current at the electrical angle of 240° is equal to 27.1A because the instruction voltage is equal to 2.98V and the coil resistance is equal to 110 mΩ. Accordingly, the motor average current at the electrical angle of 360° is equal to 30.0A. Next, from the equation (3), Next instruction voltage=2.98+(25.0−30.0)× 0.03=2.83V The instruction voltage of the period subsequent to the electrical angle of 360° is equal to 2.83.

Next, the motor average current at the electrical angle of 540° is calculated. The motor current at the electrical angle 540° is equal to 28.3A because the instruction voltage is equal to 2.83V and the coil resistance is equal to 100 mΩ. The motor current at the electrical angle of 480° is equal to 31.4A because the instruction voltage is equal to 2.83V and the coil resistance is equal to 90 mΩ. The motor current at the electrical angle of 420° is equal to 25.7A because the instruction voltage is equal to 2.83 V and the coil resistance is equal to 110 mΩ. Accordingly, the motor average current at the electrical angle of 540° is equal to 28.5A. Next, from the equation (3), Next instruction voltage=2.83+(25.0−28.5)× 0.03=2.73V The instruction voltage for the period subsequent to the electrical angle of 540° is equal to 2.73V.

Subsequently, the motor average current at the electrical angle of 720° is calculated. The motor current at the electrical angle of 720° is equal to 27.3A because the instruction voltage is equal to 2.73V and the coil resistance is equal to 100 mΩ. The motor current at the electrical angle of 660° is equal to 30.3A because the instruction voltage is equal to 2.73V and the coil resistance is equal to 90 mΩ. The motor current at the electrical angle of 600° is equal to 24.8A because the instruction voltage is equal to 2.73V and the coil resistance is equal to 110 mΩ. Accordingly, the motor average current at the electrical angle of 720° is equal to 27.5A. Next, from the equation (3), Next instruction voltage=2.73+(25.0−27.5)× 0.03=2.66V The instruction voltage of the period subsequent to the electrical angle 720° is equal to 2.66V. As described above, by gradually reducing the instruction voltage, the motor average current slowly approaches to the target current (25.0A).

In the case of the control device for the automatic transmission according to the third embodiment, the target current is varied at the electrical angle of 240°. The motor average current is calculated from past three data under the condition that the current value which is sampled at the timing at which the variation of the latest hall sensor signal is detected is set as the latest data, thereby renewing the instruction voltage. Accordingly, the instruction voltage can be changed at the timing of the electrical angle of 240° at which the target current is switched. The control operation of the control device for the automatic transmission according to the third embodiment will be described by using actual numerical values.

First, the motor average current at the electrical angle of 240° is calculated. The motor current at the electrical angle of 240° is equal to 27.1A because the instruction voltage is equal to 2.98V and the coil resistance is equal to 110 mΩ. The motor current at the electrical angle of 180° is equal to 29.8A because the instruction voltage is equal to 2.98V and the coil resistance is equal to 100 mΩ. The motor current at the electrical angle of 120° is equal to 33.1A because the instruction voltage is equal to 2.98V and the coil resistance is equal to 90 mΩ. Accordingly, the motor average current at the electrical angle of 180° is equal to 30.0A. Next, from the equation (3), Next instruction voltage=2.98+(25.0−30.0)× 0.03=2.83V The instruction voltage subsequent to the electrical angle of 240° is equal to 2.83V.

Next, the motor average current at the electrical angle of 300° is calculated. The motor current at the electrical angle of 300° is equal to 31.4A because the instruction voltage is equal to 2.83V and the coil resistance is equal to 90 mΩ. The motor current at the electrical angle of 240° and the motor current at the electrical angle of 180° are equal to 27.1A and 29.8A respectively by using the stored values of the above detected values. Accordingly, the motor average current at the electrical angle of 300° is equal to 29.4A. Next, from the equation (3), Next instruction voltage=2.83+(25.0−29.4)× 0.03=2.70V The instruction voltage for the period subsequent to the electrical angle of 300° is equal to 2.70V.

Next, the motor average current at the electrical angle of 360° is calculated. The motor current at the electrical angle of 360° is equal to 27.0A because the instruction voltage is equal to 2.70V and the coil resistance is equal to 100 mΩ. The motor current at the electrical angle of 300° and the motor current at the electrical angle of 240° are equal to 31.4A and 25.7A respectively by using stored values of the above detected values. Accordingly, the motor average current at the electrical angle of 240° is equal to 28.0A. Next, from the equation (3), Next instruction voltage=2.70+(25.0−28.0)× 0.03=2.61V The instruction voltage for the period subsequent to the electrical angle of 360° is equal to 2.61V.

By repeating the calculation as described above, the control device for the automatic transmission according to the third embodiment can gradually reduce the instruction voltage so that the average value of the motor current can gradually approach to the target current as shown in FIG. 9. Furthermore, it is apparent that the average value of the motor current approaches to the target current more early as compared with the control device for the automatic transmission according to the second embodiment. Accordingly, it is understood that the control device for the automatic transmission according to the third embodiment can enhance the performance of following the target current.

Next, the operation of the control device for the automatic transmission according to the third embodiment will be described with reference to a flowchart. FIG. 10 is a flowchart showing the operation of the automatic transmission according to the third embodiment. This device operates on the basis of interrupt of each edge signal of the hall sensor 205 mounted in the brushless motor 204.

First, the motor current is subjected to A/D conversion in step S1001, and then the processing goes to step S1002.

Subsequently, in step S1002, the latest three data out of the previously A/D-converted data are stored.

Subsequently, the processing goes to step S1003, the average value of the motor current is calculated from the previously stored latest three data and then the processing goes to step S1004. As described above, the average value of the motor current over the electrical angle of 180° in the brushless motor 204 is calculated every hall edge interrupt. The steps S1001 to S1003 are executed by the current detecting unit 601.

Subsequently, in step S1004, the difference between the motor target current set in the motor target current calculating unit 212 and the motor detection current detected by the current detecting unit 601 is calculated.

Subsequently, the processing goes to step S1005, the output duty is calculated in accordance with the difference calculated in step S1004, and then the hall edge interrupt processing routine is finished. The steps S1004 and S1005 are executed by the motor driving duty calculating unit 213. The calculated output duty is output through the driver driving unit 214 to the inverter 203, whereby the rotation of the brushless motor 204 is controlled.

As described above in detail, according to the control device for the automatic transmission according to the third embodiment, the current average value over the electrical angle of 180° can be renewed every 60° in electrical angle, so that the following performance when the target current varies can be further enhanced. Even when the target torque varies, the torque can follow the target torque excellently, so that the torque control precision of the clutch 103 can be enhanced and the travel state of the vehicle can be kept stable.

Fourth Embodiment

Next, a control device for an automatic transmission according to a fourth embodiment will be described.

In the first embodiment, the stability of the motor current when the coil resistance is dispersed among the respective phases of the brushless motor is secured. In the second or third embodiment, the motor average current is made to follow the target current. In the fourth embodiment, the dispersion of the motor current which is caused by the dispersion of the motor coil resistance is suppressed.

The control device for the automatic transmission according to the fourth embodiment uses a current detecting unit 1101 shown in FIG. 11 in place of the current detecting unit 209 constituting the motor control unit 201 of FIG. 2 described in the first embodiment, and the other construction is the same as the first embodiment. The following description will be made with reference to FIG. 1 or 2.

A current detecting unit 1101 used in the control device for the automatic transmission according to the fourth embodiment is provided with a counter 1102 for counting the number of edges of the hall sensor signal, an electrical angle 180° judging unit 1103 for judging on the basis of the count value of the counter 1102 that the brushless motor 204 rotates by 180° in electrical angle, and a current value storing unit 1104 for storing a current value calculated on A/D-converted data every edge of the hall sensor signal. Furthermore, the current detecting unit 1101 is provided with a current ratio calculating unit 1105 for setting a current value to the latest count value as a reference value and calculating a current ratio to the reference current every count value on the basis of the data of the counter 1102, the electrical angle 180° judging unit 1103 and the current value storing unit 1104, and a current ratio calculating completion judging unit 1106 for judging completion or non-completion of the current ratio calculation in the current ratio calculating unit 1105. The current ratio calculation completion judging unit 1106 reflects the current ratio calculation result to the control only when the current ratio calculation is completed.

The control device for the automatic transmission according to the fourth embodiment is constructed as described above. Next, the operation thereof will be described. In the following description, the hall sensor signal for the electrical angle of 180° is counted by the counter 1102, and only current detection values whose number corresponds to an integral multiple of the count value of the counter 1102 may be stored. Only the current detection values whose number corresponds to the integral multiple of the count value of the counter 1102 may be stored.

Figure 12:
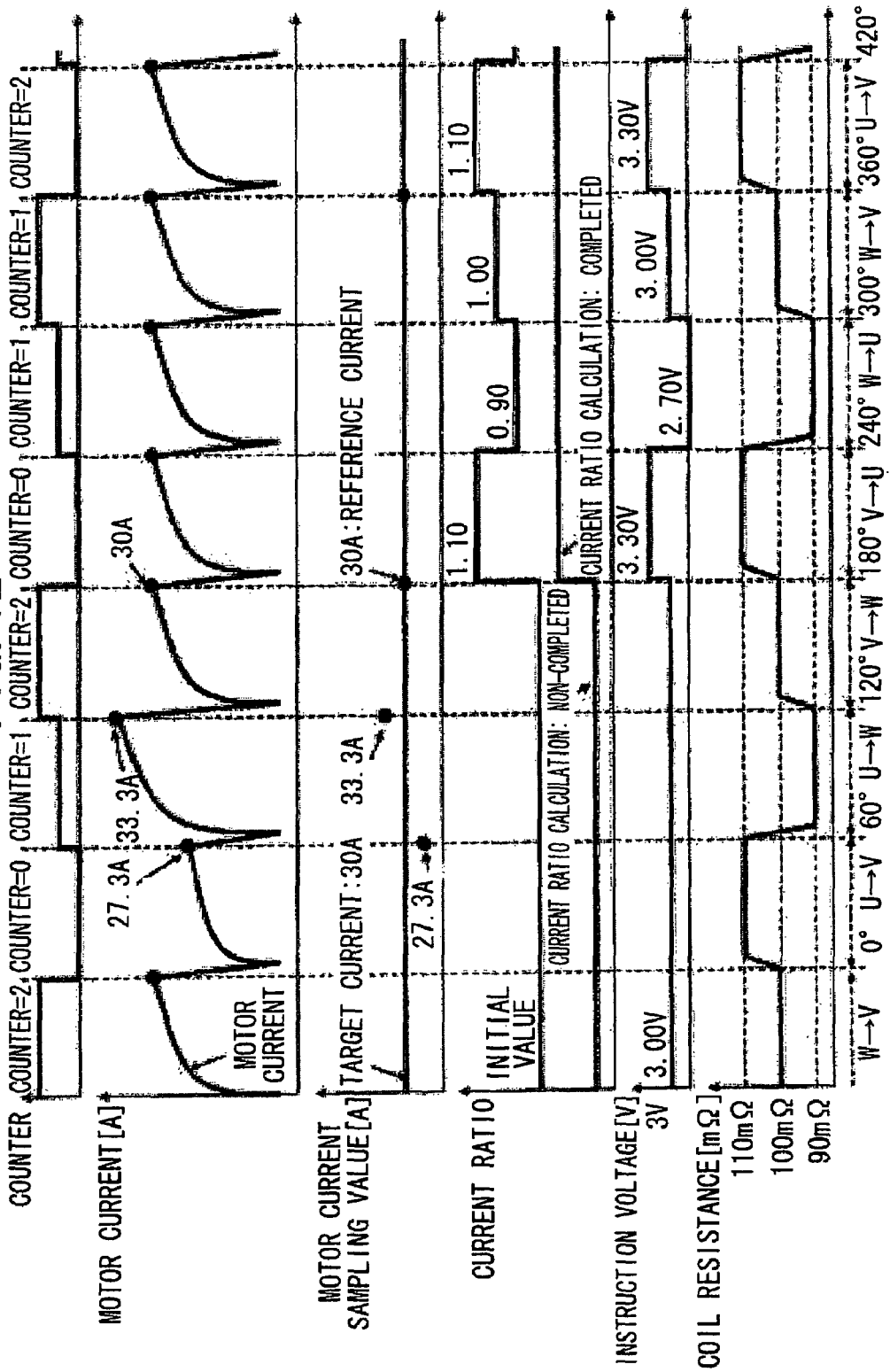
FIG. 12 is a diagram showing a current feedback control result in the automatic transmission control device according to the fourth embodiment.

The counter 1102 of the control device for the automatic transmission according to the fourth embodiment renews the value every 60° in electrical angle as shown in FIG. 12. At the electrical angle of 0°, the counter is set to 0, at the electrical angle of 60°, the counter is set to 1, and at the electrical angle of 120°, the counter is set to 2. Subsequently, when the electrical angle is equal to 180°, the counter is set to 0, and subsequently the counter repeats 0→1→2→0→1.

Next, the coil resistance of each phase of the brushless motor 204 will be described by using "response" when the coil resistance values of the U-phase coil, the V-phase coil and the W-phase coil are set to 50 mΩ, 60 mΩ and 40 mΩ, respectively.

In FIG. 12, current is made to flow from the U-phase to the V-phase for the period between 0° and 60° in electrical angle, and thus the coil resistance is equal to 110 mΩ. Current is made to the flow from the U-phase to the W-phase for the period between 60° and 120° in electrical angle, and thus the coil resistance is equal to 90 mΩ. Subsequently, current is made to flow from the V-phase to the W-phase for the period between 120° and 180° in electrical angle, and thus the coil resistance is equal to 100 mΩ. Subsequently, current is made to flow from the V-phase to the U-phase for the period between 180° and 240° in electrical angle, and thus the coil resistance is equal to 110 mΩ. Subsequently, current is made to flow from the W-phase to the V-phase for the period between 240° and 300° in electrical angle, and thus the resistance coil is equal to 90 mΩ. Subsequently, current is made to flow from the W-phase to the V-phase for the period between 300° and 360° in electrical angle, and thus the coil resistance is equal to 100 mΩ. As in the case of the period between 0° and 60° in electrical angle, current is made to flow from the U-phase to the V-phase for the period between 360° and 420° in electrical angle, and thus the coil resistance is equal to 110 mΩ. As described above, three values of 110 mΩ, 90 mΩ and 100 mΩ are provided as the values of the coil resistance, and these three resistance values are successively repeated.

Next, it is assumed that the control is sufficiently stable before the electrical angle of 0°, and the control after the electrical angle of 0° will be described. The motor current before the electrical angle reaches 180° is dispersed in accordance with the coil resistance while the instruction voltage is set to 3V. In FIG. 12, at the electrical angle of 60°, the motor current is equal to 27.3A, at the electrical angle of 120°, the motor current is equal to 33.3A, and at the electrical angle of 180°, the motor current is equal to 30.0A. These current values and the counter values are stored in association with one another in the current value storing unit 1104. In this embodiment, the current value of the latest counter value is set as a reference value, and thus in the case of FIG. 12, the current (30.0A) at K=2 is set as reference current.

The current ratio and the instruction voltage are calculated from the following equations, Current ratio=reference current value/current value    (5)

Instruction voltage correction value=instruction voltage×current ratio    (6)

Subsequently, the current ratio when the count value of the counter is equal to zero is calculated. The current value at the counter value=0 is equal to 27.3A, and thus from the equation (5), Current ratio=30.0/27.3=1.10

Accordingly, the current ratio in the case of the counter=0 is equal to 1.10.

Since the current value at the counter value=1 is equal to 33.3A, the current ratio at the counter value=1 is likewise calculated from the equation (5) as follows:

Current ratio=30.0/33.3=0.90

Accordingly, the current ratio at the counter value=1 is equal to 0.90.

Likewise, the current ratio when the counter=2 is calculated from the equation (5) as follows, because the current value when the counter=2 is equal to 30.0A.

Current ratio=30.0/30.0=1.00

Accordingly, the current ratio when the counter=2 is equal to 1.00.

When the above calculation is completed, the completion of the current ratio calculation is settled by the current ratio calculation completion judging unit 1106.

Subsequently, the instruction voltage subsequent to 180° in electrical angle is calculated. The current ratio calculation is completed subsequently to the electrical angle of 180°, and thus the correction of the instruction voltage is executed according to the equation (6). Since the counter=0 at the electrical angle of 180°, the current ratio is equal to 1.10. Accordingly, from the equation (6), Instruction voltage correction value=3.00×1.10=3.30

At the electrical angle of 240°, the count value of the counter is equal to 1, and thus the current ratio is equal to 0.90. Accordingly, from the equation (6), Instruction voltage correction value=3.00×0.90=2.70

At the electrical angle of 300°, the count value of the counter is equal to zero, and thus the current ratio is equal to 1.00. Accordingly, from the equation (6), Instruction voltage correction value=3.00×1.00=3.00

Subsequently, by repeating the above calculation, the instruction voltage correction value corresponding to the counter.

Here, for the period between 180° and 240° in electrical angle, from the above equation, the instruction voltage is equal to 3.30V and the coil resistance 110 mΩ and thus the motor current is equal to 30.0A. Furthermore, for the period between 240° and 300°, from the above equation, the instruction voltage is equal to 2.70V and the coil resistance is equal to 90 mΩ and thus the motor current is equal to 30.0A. For the period between 300° and 360° in electrical angle, from the above equation, the instruction voltage is equal to 3.00V and the coil resistance is equal to 100 mΩ and thus the motor current is equal to 30.0A. Subsequently, the above state is repeated in accordance with the counter value.

As described above, subsequently to the electrical angle of 180° at which the current ratio calculation of the current ratio calculating unit 1105 is completed, the motor current is fixed and thus the dispersion thereof is suppressed.

Figure 13:
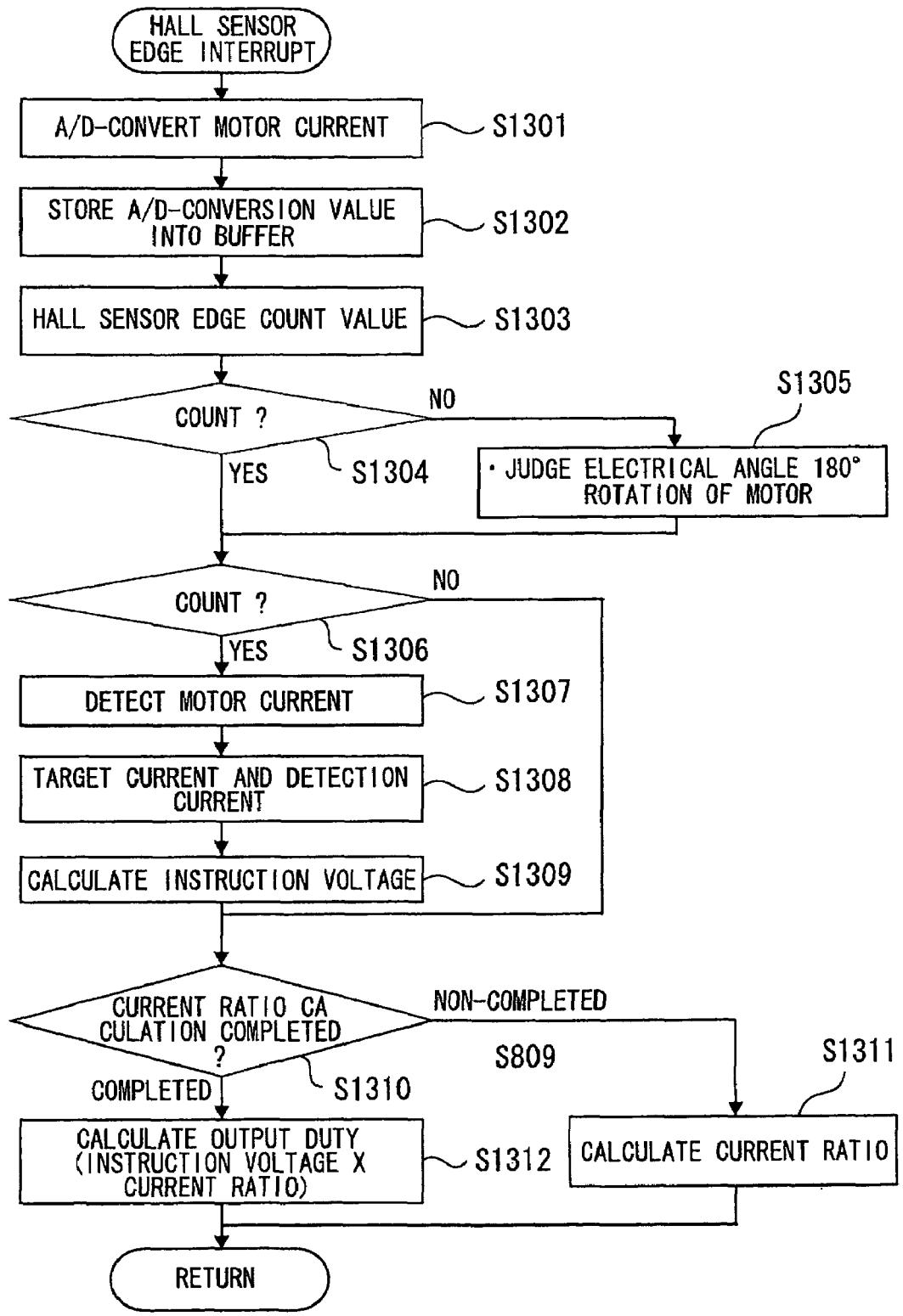
FIG. 13 is a flowchart showing the operation of the automatic transmission control device according to the fourth embodiment.

Next, the operation of the control device for the automatic transmission according to the fourth embodiment will be described with reference to a flowchart. FIG. 13 is a flowchart showing the operation of the control device for the automatic transmission according to the fourth embodiment, and shows a case where the sampling timing of the current value is set to every 180° in electrical angle. This device is operated on the basis of the interrupt of each edge signal of the hall sensor 205 mounted in the brushless motor 204.

First, in step S1301, the motor current is subjected to A/D conversion, and in step S1302 the A/D-converted data are stored into the buffer.

Subsequently, in step S1303, the hall sensor edge count value is incremented.

Subsequently, the processing goes to step S1304 to judge the previously-counted edge count value.

Here, when the count value is equal to three (trice) or more, the processing goes to the judgment "No", and it is judged in step S1305 that the brushless motor 204 rotates by 180° in electrical angle. At the same time, the count value is cleared, and the processing goes to step S1306. On the other hand, when the count value is equal to two (twice) or less, the processing goes to the judgment "Yes", and then the processing goes to step S1306.

Subsequently, in step S1306, it is judged whether the count value is equal to zero or not. When the count value is equal to zero, the processing goes to the judgment "Yes", the motor current is calculated in step S1307 and then the processing goes to step S1308. On the other hand, when the count value is not equal to zero, the processing goes to the judgment "No", and then the processing goes to step S1310.

In step S1308, the difference between the motor target current set in the motor target current calculating unit 212 and the motor detection current detected in the current detecting unit 1101 is calculated. Subsequently, the processing goes to step S1309, and the instruction voltage is calculated according to the difference calculated in step S1308.

Subsequently, in step S1310, the completion state of the current ratio calculation is checked, and when the current ration calculation has not yet been completed, the processing goes to step S1311 to calculate the current ratio. Thereafter, the hall sensor edge interrupt processing routine is finished.

In step S1310, the current ratio calculation completion state is checked, and if the completion is confirmed, the processing goes to step S1312 to multiply the instruction voltage calculated in step S1309 by the current ratio corresponding to the counter value, thereby correcting the instruction voltage, and calculate the output duty.

As described above, the motor current is detected every time the hall edge interrupt is made thrice, that is, every time the brushless motor 204 rotates by 180° in electrical angle, and the output duty is calculated and corrected to an optimum output duty by using the current ratio every hall edge. The steps S1301 to S1307, the step S1310 and the step S1311 are executed by the current detecting unit 1101, and the step S1308, the step S1309 and the step S1312 are executed by the motor driving duty calculating unit 213. The corrected output duty is output to the inverter 203 through the driver driving unit 214, and the rotation of the brushless motor 204 is controlled.

As described above, according to the control device for the automatic transmission according to the fourth embodiment, the dispersion of the motor current is suppressed, and the torque dispersion of the clutch 103 can be nullified. Accordingly, the engaging force of the clutch 103 can be controlled precisely, the driving power transmitted to the wheels can be stabilized, and excellent driving performance can be implemented without making a driver feel uncomfortable.

In the above embodiments, the control device for the automatic transmission is controlled by the brushless motor. However, another equivalent motor may be used. This invention contains various modifications and alterations on design without departing from the subject matter of the present invention.

The control device for the automatic transmission according to the present invention may be used as an automatic transmission control device which performs gear shift control by a motor.

Various modifications and alterations of this invention will be apparent t those skilled in the art without departing from the scope and spirit of this invention, and it should be understood that this is not limited to the illustrative embodiments set forth herein.

What is claimed is:

1. A control device for controlling an automatic transmission in which driving power of an engine is transmitted to a gear shift mechanism through a clutch, engaging force of the clutch being adjusted by a motor, the control device comprising:
    a motor control unit for controlling the rotation of the motor, wherein the motor control unit has a motor target current calculating unit for calculating target current in the motor, a current detecting resistor for detecting motor current flowing when the motor rotates, and a current detecting unit for sampling a voltage occurring in the current detecting resistor to detect the motor current, and the current detecting unit has a counter for counting a variation number of a rotational position signal output from a rotational position detecting unit for detecting the rotational position of the motor, and an electrical angle 180° judging unit for judging on the basis of the count value of the counter that the motor rotates at 180° in electrical angle, and wherein the voltage occurring in the current detecting unit is sampled at each timing corresponding to an integral multiple of 180° in electrical angle that is detected by the electrical angle 180° judging unit, and rotation of the motor is controlled in accordance with the difference between the motor target current calculated by the motor target current calculating unit and the motor current.

2. A control device for an automatic transmission in which driving power of an engine is transmitted to a gear shift mechanism through a clutch, engaging force of the clutch being adjusted by a motor, the control device comprising:
    a motor control unit for controlling the rotation of the motor, wherein the motor control unit has a motor target current calculating unit for calculating target current in the motor, a current detecting resistor for detecting motor current flowing when the motor rotates, a current detecting unit for sampling a voltage occurring in the current detecting resistor to detect the motor current, and the current detecting unit has a counter for counting a variation number of a rotational position signal output from a rotational position detecting unit for detecting the rotational position of the motor, and an electrical angle 180° judging unit for judging on the basis of the count value of the counter that the motor rotates at 180° in electrical angle, and a current value storing unit for calculating the number of variations of the rotational position signal for the rotation of the electrical angle of 180° of the motor from the electrical angle 180° judging unit and the counter and storing only motor current values which are detected by the current detecting unit and whose number corresponds to an integral multiple of the variation number, and wherein an average value of the motor current values stored in the current value storing unit, and the rotation of the motor is controlled in accordance with the difference between motor target current calculated in the motor target current calculating unit and the average value of the motor current values.

3. The control device for the automatic transmission according to claim 2, wherein the motor current values stored in the current value storing unit contain, as the latest data, current sampled at a timing at which variation of the latest rotational position signal is detected.

4. A control device for an automatic transmission in which driving power of an engine is transmitted to a gear shift mechanism through a clutch, engaging force of the clutch being adjusted by a motor, the control device comprising:

a motor control unit for controlling the rotation of the motor, wherein the motor control unit has a motor target current calculating unit for calculating target current in the motor, a current detecting resistor for detecting motor current flowing when the motor rotates, a current detecting unit for sampling a voltage occurring in the current detecting resistor to detect the motor current, and the current detecting unit has a counter for counting a variation number of a rotational position signal output from a rotational position detecting unit for detecting the rotational position of the motor, an electrical angle 180° judging unit for judging on the basis of the count value of the counter that the motor rotates at 180° in electrical angle, and a current value storing unit for calculating the number of variations of the rotational position signal for the rotation of the electrical angle of 180° of the motor from the electrical angle 180° judging unit and the counter and storing only motor current values which are detected by the current detecting unit and whose number corresponds to an integral multiple of the variation number, and a current ratio calculating unit for setting the current at the count value of the counter to reference current and calculating a ratio of the current stored in the current value storing unit to the reference current every count value, and wherein it is judged whether the current ratio calculation of the current ratio calculating unit is completed or not, and the rotation of the motor is controlled in accordance with the difference between motor target current calculated in the motor target current calculating unit and a value obtained by multiplying the motor current by the calculation result of the current ratio calculating unit.

5. The control device for the automatic transmission according to claim 1, wherein the rotational position detecting unit is constructed by a plurality of hall sensors and the rotational position signal is a hall sensor signal output from the plural hall sensors.

6. The control device for the automatic transmission according to claim 2, wherein the rotational position detecting unit is constructed by a plurality of hall sensors and the rotational position signal is a hall sensor signal output from the plural hall sensors.

7. The control device for the automatic transmission according to claim 3, wherein the rotational position detecting unit is constructed by a plurality of hall sensors and the rotational position signal is a hall sensor signal output from the plural hall sensors.

8. The control device for the automatic transmission according claim 4, wherein the rotational position detecting unit is constructed by a plurality of hall sensors and the rotational position signal is a hall sensor signal output from the plural hall sensors.

* * * * *